(12) United States Patent
Rakib et al.

(10) Patent No.: US 7,490,345 B2
(45) Date of Patent: Feb. 10, 2009

(54) UPSTREAM ONLY LINECARD WITH FRONT END MULTIPLEXER FOR CMTS

(75) Inventors: Shlomo Selim Rakib, Cupertino, CA (US); Yehuda Azenkot, Cupertino, CA (US)

(73) Assignee: Terayon Communications Systems, Inc., Santa Clara, CA (US)

( * ) Notice: Subject to any disclaimer, the term of this patent is extended or adjusted under 35 U.S.C. 154(b) by 942 days.

(21) Appl. No.: 10/860,857

(22) Filed: Jun. 4, 2004

(65) Prior Publication Data

US 2005/0010958 A1    Jan. 13, 2005

Related U.S. Application Data

(63) Continuation-in-part of application No. 10/191,164, filed on Jul. 8, 2002, now Pat. No. 7,298,762.

(51) Int. Cl.
| | |
|---|---|
| H04N 9/00 | (2006.01) |
| H04L 12/50 | (2006.01) |
| H04B 1/38 | (2006.01) |
| H04N 7/173 | (2006.01) |
| H04N 7/16 | (2006.01) |

(52) U.S. Cl. .................. 725/111; 725/105; 725/114; 725/116; 725/117; 725/121; 725/129; 725/144; 725/146; 725/147; 370/360; 375/222

(58) Field of Classification Search .................. 725/111, 725/105, 114, 116, 117, 121, 129, 144, 146, 725/147; 370/360; 375/222

See application file for complete search history.

(56) References Cited

U.S. PATENT DOCUMENTS

| | | | | |
|---|---|---|---|---|
| 5,768,269 A | * | 6/1998 | Rakib et al. | 370/342 |
| 5,991,308 A | * | 11/1999 | Fuhrmann et al. | 370/395.53 |
| 6,356,555 B1 | * | 3/2002 | Rakib et al. | 370/441 |
| 6,650,624 B1 | * | 11/2003 | Quigley et al. | 370/252 |
| 6,791,995 B1 | * | 9/2004 | Azenkot et al. | 370/436 |
| 7,113,484 B1 | * | 9/2006 | Chapman et al. | 370/252 |
| 7,209,442 B1 | * | 4/2007 | Chapman | 370/235 |
| 7,239,650 B2 | * | 7/2007 | Rakib et al. | 370/480 |
| 7,298,762 B2 | * | 11/2007 | Rakib | 370/468 |
| 2002/0026523 A1 | * | 2/2002 | Mallory et al. | 709/236 |
| 2007/0195824 A9 | * | 8/2007 | Chapman et al. | 370/490 |

OTHER PUBLICATIONS

International Search Report and Written Opinion, Application No. PCT/US05/18727, dated Mar. 5, 2008.

* cited by examiner

*Primary Examiner*—Hoang-Vu A Nguyen-Ba
(74) *Attorney, Agent, or Firm*—Larry T. Cullen

(57) ABSTRACT

One or more upstream line cards each include a digital or analog multiplexer front end circuit for a Cable Modem Termination System. Each upstream line card has only upstream receivers and allows a CMTS to share one or more receiver chips to receive and recover data from a larger number of input cables coupled to the front end multiplexer. A control circuit for the multiplexer uses MAP data and burst assignment data and upstream mini-slot counts for each of the input cables to determine when a burst is about to arrive on a cable and cause appropriate switching by the multiplexer or crossbar switch. In some embodiments, there is only one RF channel circuit coupled to the output of the multiplexer, so the multiplexer is controlled to couple the input cable upon which the burst is expected to the single RF channel. In some embodiments, the sample data generated by each RF channel is buffered and an arbiter picks one burst at a time for application to the input of a CMTS receiver or doles out bursts to different receivers. In other embodiments, no buffers or arbiter are used, and each RF channel has its own dedicated CMTS receiver.

32 Claims, 14 Drawing Sheets

FIG. 7 DIGITAL MULTIPLEXER

UPSTREAM ONLY LINECARD WITH FRONT END MULTIPLEXER FOR CMTS

CROSS REFERENCE TO RELATED APPLICATIONS

This patent application is a continuation in part of U.S. patent application Ser. No. 10/191,164, entitled "ANALOG FRONT END MULTIPLEXER FOR CMTS RECEIVER," filed on Jul. 8, 2002, which is hereby incorporated by reference. This technology is also related to the technology disclosed in U.S. Pat. No. 7,298,762, entitled "METHOD FOR SHARING AN UPSTREAM AMONG MULTIPLE DOWNSTREAMS," issued on Nov. 20, 2007, which is hereby incorporated by reference. This technology is also related to the technology disclosed in U.S. patent application Ser. No. 10/725,092, entitled "CABLE MODEM TERMINATION SYSTEM WITH FLEXIBLE ADDITION OF SINGLE UPSTREAMS OR DOWNSTREAMS," filed on Dec. 1, 2003, which is hereby incorporated by reference.

FIELD OF USE AND BACKGROUND OF THE INVENTION

The invention finds utility in the field of Cable Modem Termination Systems (hereafter CMTS).

In the early stages of broadband cable modem deployment, frequently individual neighborhoods served by a cable systems do not have a full complement of customers. Today, CMTS receivers are available that have the capability to handle a constant stream of bursts at 5.12 megasymbols per second. Such CMTS receivers are available from the assignee of the invention. If such a receiver is dedicated to serving one cable system coupled to the homes in one neighborhood, it will be underutilized during the initial stages of deployment because not enough bursts are being transmitted upstream from the served neighborhood to keep the CMTS receiver busy full time. This problem would exist if a single CMTS receiver is dedicated to each cable in a CMTS which is coupled to multiple cable systems.

The solution to this problem which has been attempted in the prior art is to concentrate all the bursts from all the cable systems serving multiple different neighborhoods together on one cable. This creates an even bigger noise problem than the cable upstream of a single cable system already has because all the noise from all the cables is concentrated into one cable that is coupled to the CMTS receiver. This, therefore, is an unsatisfactory solution since noise in the upstream is already a well recognized problem even in a single cable system. To multiply this noise problem by aggregating bursts from multiple cable systems into one cable is untenable.

Further, the assignee of the present invention has developed a technology to decouple downstreams from upstreams. This allows flexible mapping of upstreams to downstreams which can be controlled from the CMTS. Further, with this technology, more than one upstream can share a single downstream and more than one downstream can share a single upstream. The ability to do this has created a need for a line card which has only one or more upstream receivers thereon as opposed to the fixed ratio of upstream receivers and downstream transmitters found in prior art line cards. With prior art line cards, as the cable operator encounters the need to add more upstream capacity as penetration becomes larger, the cable operator is forced to buy downstream transmitter capacity simultaneously which he does not need. Therefore a need has arisen for an upstream line card which only has upstream receivers on it and no downstream transmitters to allow more flexibility in adding upstream capacity without having to simultaneously add unneeded downstream capacity.

SUMMARY OF THE INVENTION

The teachings of the invention contemplate a genus of line cards with only usptream receivers and the processes these line cards carry out to share one or more DOCSIS compatible receivers to receive upstream data transmitted from a number of optical nodes which is larger than the number of receivers, all without noise aggregation. A line card with only upstream receivers is new in the art because prior art line cards included a fixed ratio of upstream receivers and downstream transmitters. When subscriber penetration is low, the approach of the invention allows sharing of complicated PHY receivers to make most efficient use. As subscriber penetration grows, additional upstream line cards can be easily added without requiring the cable operator to buy downstream transmitter they may not need, as would be required by the prior art approach to line cards. Likewise, line cards with only downstream transmitters are enabled by the invention to allow additional downstreams to be added without the need to add unneeded upstream capacity.

However, sharing receivers among multiple optical nodes creates a noise aggregation problem if the upstreams from the various optical nodes are simply summed.

In all species described herein, noise aggregation is avoided in non contention intervals by not summing the signals from multiple optical nodes. Noise aggregation in contention intervals is avoided by not summing signals from different optical nodes, energy sensing and picking one or more bursts that arrive simultaneously (the number equaling the number of outputs of the switch) for further processing and ignoring all others.

The characteristics that all species in the genus share are as follows.

1) coordinating MAP messages and downstreams associated with a group of upstreams to be received by one or more shared upstream DOCSIS compatible receivers so that said downstreams are synchronized and said MAP messages define the same contention intervals for all said upstreams and authorize bursts on said upstreams that are to be received by one or more shared DOCSIS receivers such that there is either no overlap in upstream bursts from said different optical nodes or the amount of overlap does not exceed the number of shared DOCSIS receivers available to receive the bursts;

2) receiving upstream radio frequency transmissions from a plurality of different optical nodes in one or more HFC systems and sampling said signals to convert them to digital signals;

3) selecting one or more signals or sets of samples from one or more optical nodes in an analog multiplexer or digital crossbar switch for reception and coupling each selected signal or set of samples to an input of a shared DOCSIS receiver; and 4) if the selected signal or signals have not been digitized by sampling, sampling said one or more selected signals before coupling said samples to said inputs of said one or more shared DOCSIS receivers.

The use of an analog multiplexer or digital crossbar switch to control the inputs to the shared DOCSIS receiver(s) if useful for on-the-fly switching of optical nodes to different PHY receivers—a feature which is useful for dynamic load balancing. Dynamic load balancing allows modems which desire to transmit upstream to be shifted to other logical channels as the channels they are on approach maximum capacity. Sharing receivers is also useful where there is low subscriber penetration.

Various species within this broad genus definition have the following characteristics:

A) Some species do not use RF tuners to receive the upstream radio frequency signals and just use broadband amplifiers to amplify the entire upstream band according to predetermined gain control data and use wideband passband filters to suppress noise outside the upstream band limits and tuning to specific upstream logical channels is done in the PHY receivers;

B) Some species use RF tuners that are supplied with MAP and UCD data to tune to specific upstream logical channels, amplify the signals according to gain control numbers set to utilize the full dynamic range of A/D converters, digitize the amplified signals and filter them with digital filters having passbands and center frequencies according to UCD center frequency and symbol rate data for the channel being received.

C) Some species use digital multiplexers or crosspoint switches and digitize the received signals before supplying the resulting samples to the multiplexers or crosspoint switches.

D) Some species use only one shared PHY DOCSIS receiver and a multiplexer, and others use multiple PHY DOCSIS receivers and a crosspoint or crossbar switch;

E) Some species use FIFO memories to store the samples on each output channel of the multiplexer or crossbar switch, while others do not use FIFO buffers and depend upon the MAP messages to prevent excessive overlap in bursts during non contention intervals and depend upon energy sensing of bursts at inputs during contention intervals to select bursts for sampling and coupling to the shared receiver or receivers.

F) Some species use a separate controller to control the switching by the multiplexer or crossbar switch to assign bursts to available receivers using MAP and UCD data and supply the appropriate data to the PHY receivers to enable them to set up at the proper time to receive the assigned bursts.

G) Some species have the one or more shared PHY receivers coupled to one or more switching control inputs of the multiplexer or crossbar switch to control switching thereof.

H) Some species use FIFOs at the output of the PHY receivers to store data recovered from the processed bursts.

I) Some species use a FIFO dedicated to each output of the multiplexer or crosspoint switch to store samples so that overlapping bursts can be scheduled even during non contention intervals.

J) Some species use narrow band excision circuitry following the A/D conversion to remove narrowband interference before the samples are supplied to the shared receivers.

K) Some species use low pass and high pass filters to divide the upstream band from each optical node into a high half and a low half.

L) Some species use only broadband amplifiers and wideband passband filters, an analog multiplexer or digital crossbar switch (depending upon where the A/D conversion is done) and PHY receiver(s), an arbitrator and UMAC circuitry.

One important subgenus which uses RF tuners is defined as follows. First, a plurality of RF tuners are coupled to a plurality of coaxial cables of one or more hybrid fiber coaxial cable systems. Each RF tuner functions to tune to an upstream logical channel upon which a burst will be arriving, and amplify and filter incoming burst signals to prepare them for analog to digital conversion. Each of the RF tuners outputs its signals so processed to a different input of an analog multiplexer or crossbar switch which has a plurality of inputs and one or more outputs, with the outputs being fewer or equal in number than the inputs. Each output is coupled to an analog to digital converter which samples the signals at the output to generate a sample stream. Each sample stream is coupled directly or indirectly to an input of a DOCSIS receiver which functions to process the samples to recover data encoded in the burst. Each receiver (and there may be only one) is assigned to receive specific upstream bursts and in the case of a single receiver, that receiver is assigned to receive all the bursts. In multiple receiver embodiments, an arbiter receives UCD and MAP data and keeps track of which receivers are available and assigns bursts and sends the receivers the UCD and MAP data they need to configure themselves properly to receive the bursts they have been assigned to receive. The switching of the analog multiplexer or crossbar switch is controlled so that bursts that are assigned to particular DOCSIS receivers are coupled from the input at which the burst signal appears to the appropriate output to which the receiver assigned to process the burst is coupled. The analog multiplexer or crossbar switch is like a crossbar switch or a single-output multiplexer or any other arrangement which can couple a selected input to a selected output under control of one or more switching commands. Each receiver processes DOCSIS burst samples and recovers the data encoded in the burst. The recovered data is output to an upstream media access control process which carries out DOCSIS training, registration and other protocols, generates UCD data for each logical upstream and receives bandwidth requests from registered cable modems and responds by making grants and generating a downstream MAP message for every upstream logical channel which tells each cable modem when it can burst on a particular logical channel to which the MAP message relates. The UMAC process coordinates the generation of the MAP messages for the upstream channels based upon how many receivers are available and whether or not FIFO buffer capacity is in use to store samples generated by the A/D converters and to store recovered data by the receivers.

Various species within this subgenus include: using from one to some higher number of PHY receivers; using FIFO buffers dedicated to each receiver to store the sample data output by the A/D converters; using FIFO buffers to store data recovered by the PHY receivers; using the PHY receivers to generate the control signals to control switching by the output of the digital switch to which the PHY receiver is coupled through the A/D converters; using an arbiter to receive UCD and MAP data and assign receivers to receive the various bursts and send the UCD and MAP data to the receivers as needed; using the PHY receivers to control the gain of the RF tuners or RF amplifier sections without tuners; sending UCD and MAP data and burst assignment data to the RF tuners through a control circuit so they will know when bursts are arriving on particular channels and the UCD data for the channel and can properly configure for bursts they are assigned to process; using the UMAC process to control the gain of the RF tuners or RF amplifier sections without tuners; coordinating MAP messages when there is only one receiver so that bursts on different channels do not overlap in time; coordinating MAP messages when there are multiple receivers so that there can be overlap in time but there is never more bursts arriving simultaneously on different logical channels than there are receivers being shared; coordinating MAP message generation when there are one or more shared receivers and FIFOS to store samples and recovered data so that the average amount of burst data arriving at any particular time does not exceed the capacity of the available receivers to process burst sample data; using narrow band excision filters to filter the samples output from each A/D converter to remove narrow band interference; and using high pass and low pass filters coupled to the output of each RF tuner (or RF amplifier section without tuner), each filter feeding its own input to the crossbar switch to divide the frequency spectrum of each cable into a high frequency band and a low frequency band.

Underutilization of CMTS receiver capacity is a problem in DOCSIS systems with low penetration. The solution to underutilization of CMTS receiver throughput provided by the present invention is use an analog or digital multiplexer at the front end of a CMTS receiver to selectively couple multiple upstream channels on different cables to one or more CMTS receiver line cards that are fewer in number than the number of upstream cables. More precisely, when subscriber penetration is low and CMTS receiver line cards are not fully utilized, a multiplexer can be used with suitable mapping of upstream bursts so that they do not overlap in time so as to concentrate the upstream bursts to one or more upstream receivers so as to maximize the efficiency of utilization of the upstream receiver line cards. The upstream channels on different cables all share the same downstream so that MAP messages allocating bandwidth can be coordinated such that bursts to be received on different upstream channels do not overlap in time. This allows a multiplexer coupled to the various cable systems to be controlled so that bursts from the different cable systems and different upstream channels can be coupled to the input of a single shared CMTS receiver (or to the inputs of few receivers which are smaller in number than the number of upstream channels serviced.

There are several different subgenera within this genus, each applicable to a different situation. An analog multiplexer can be used or a digital multiplexer can be used, the difference being where the analog-to-digital conversion occurs.

The various analog multiplexer species will be summarized first. One embodiment uses the Media Access Control (MAC) process or processes to control upstream channel bandwidth allocation so that the bursts allocated to the various cable upstreams do not overlap in time. In this embodiment, a single RF channel with no buffer (this makes it cheaper to implement) is selectively coupled through the multiplexer to the input cable upon which the burst will be arriving. The RF channel mixes the burst down to baseband and samples it in some embodiments. In the preferred analog embodiment, the analog multiplexer outputs RF signals to RF amplifier sections which amplify them in broadband gain control amplifiers, digitize the amplified signals and store the samples. No tuning to specific upstream logical channels is performed in this preferred analog multiplexer embodiment.

The samples are input to a CMTS DOCSIS compatible receiver which recovers the payload data. The RF channel can receive control information defining the center frequency of each logical channel so selected from the Media Access Control process or from the control circuit that controls the multiplexer.

In another embodiment, the MAC process allocates upstream bandwidth without restriction such that logical channels on various input cables can overlap in time or logical channels on the same cable can overlap in time so long as they do not overlap in bandwidth. There can also be multimode channels on the same cable where multiple logical channels having different Upstream Channel Descriptor (UCD) characteristics are transmitted on the same medium in a shared bandwidth but each of the different "modes", that is bursts with different UCD characteristics, is transmitted during different time intervals. These different "modes" each are a separate logical channel. Each logical channel can be transmitted on the same carrier signal or the different modes can be transmitted on carrier signals with overlapping bandwidth and different center frequencies. In this situation, an embodiment is used with an analog crossbar switch having multiple inputs each of which can be coupled to one HFC cable and multiple outputs, each of which can be coupled to any one of a plurality of output radio frequency (RF) channels. Each RF channel is bufferless and has an output which feeds the input of a dedicated CMTS receiver. The number of CMTS receivers is fewer than the number of input cables.

Another embodiment for the situation having overlap in time or bandwidth, but not both, is an embodiment which has multiple inputs, each coupled to one HFC cable and multiple RF channels, each coupled to one output of the crossbar switch, each RF channel having a buffer. A single CMTS receiver or multiple CMTS receivers is/are shared and an arbiter selects burst data from the buffers according to any arbitration scheme and feeds the selected burst data into the input of the CMTS receiver(s) for recovery of the payload data. Each burst is processed in turn in this manner even though there may have been overlap in time between the bursts on the input cables.

To the extent the multiplexers shown herein have multiple inputs and multiple outputs and can connect each input to each output, they are performing the functions of a crossbar switch and references to multiplexers should be understood to mean references to crossbar switches where multiple inputs and outputs are present.

The digital multiplexer embodiments comprise an RF section coupled to each cable input followed by an analog-to-digital converter which feeds a sample stream to a digital multplexer input which has one output coupled to a CMTS receiver PHY circuit. Alternative embodiments have the RF circuit and A/D converter feeding a digital sample stream of the signal on each HFC cable to an input of a digital crossbar switch. The crossbar switch has multiple outputs, each coupled to the input of a CMTS receiver PHY chip. In the case of a multiple input, single output digital multiplexer, the MAC process generates and sends downstream DOCSIS UCD and MAP messages on the shared downstream which establish the characteristics of each upstream logical channel and which control when upstream bursts on each upstream logical channel are authorized. The MAP messages, in the case of single shared CMTS PHY receiver, control the bursts on the various upstream logical channels so there is no overlap in time. The control circuit for the multiplexer then selectively couples the inputs of the digital multiplexer to the output such that as each burst arrives on an upstream logical channel, it is coupled to the input of the CMTS PHY receiver so as to maximize the efficiency of use of the PHY receiver.

For a digital crossbar switch embodiment feeding multiple PHY receivers, the control circuit for the crossbar switch monitors which PHYs receivers are available and monitors MAP messages for each upstream logical channel and arbitrates so as to supply each incoming burst to an available PHY receiver. The MAP messages should be coordinated in this embodiment so that the number of bursts do not overrun the capabilities of the PHY receivers to process them all. In an alternative version of this species, buffers can be added to each input to store burst samples which do not have an available PHY receiver to which the data can be sent.

Another species uses A/D converters after the crossbar switch with the PHY receiver chips each controlling the switching of one output of the crossbar switch. Each receiver chip receives UCD burst parameters, MAP data and information about which cable each burst will be arriving upon from the upstream MAC process. Each receiver configures itself properly to receive the anticipated burst and, at a time before the burst arrives, sends control signals to the control input of the crossbar switch that the PHY receiver controls to cause the switch to couple the input upon which the burst will be arriving to the output coupled to the PHY receiver chip assigned to process the burst. The MAC process sends the information elements from the MAP messages to an arbitration process which assigns PHY receivers to process specific bursts and keeps track of which PHY receivers have capacity to process new bursts. The MAC process or the PHY chips also control the gain control processing by a gain control amplifier which amplifies the upstream RF signals received from each input cable. This is done so that each incoming burst is amplified or attenuated so that the burst arrives at the A/D converter at a nominal power which does not exceed the linear region of the A/D converter and which fully utilizes the dynamic range of the A/D converter. Gain of transmitters in the cable modems is controlled by downstream messages which include power alignment adjustments from the CMTS established by a training process when the CM first powered up.

Another species splits the tuner and receiver functions into a tuner array and a receiver array. An array of tuners is coupled to an array of input HFC cables. In some embodiments, one tuner for every upstream logical channel can be used, and in other embodiments, an array of tuners fewer in number than the number of upstream logical channels is used and the tuners are assigned on an as needed basis. The tuners do A/D conversion and down convert the incoming signal to baseband and filter each burst with a variable passband filter based upon the symbol rate of the burst. Decimation is then done to remove excess samples based upon the symbol rate. The samples are stored in a dedicated portion of memory for each upstream logical channel. A receiver array has its individual receivers assigned to process the samples for designated bursts, each receiver being programmed to process the type of burst it has been assigned to process. The receivers make measurements needed by the UMAC process for ranging and training and send those measurements along with recovered data and upstream messages to a gigabit upstream media access control process (GUMAC). The GUMAC generates downstream DOCSIS messages and sends them to a downstream media access control process for transmission. The GUMAC also receives upstream DOCSIS messages needed for the training and registration protocols and other DOCSIS protocols and carries out all processing needed for upstream DOCSIS communication.

BRIEF DESCRIPTION OF THE DRAWINGS

FIG. 7 is a block diagram of a bufferless embodiment of a digital front end multiplexer-based upstream line card CMTS which couples bursts of multiple upstream channels to two or more shared upstream receivers called PHYs.

DETAILED DESCRIPTION OF THE PREFERRED AND ALTERNATIVE EMBODIMENTS

The collection of front end multiplexer embodiments disclosed in this patent application provide capability for a cable modem termination system (CMTS) to activate previously un-provisioned upstream channels by coupling them to any physical RF upstream port and shared DOCSIS receiver. The previously un-provisioned upstream channel can be associated with any downstream channel or DOCSIS MAC domain. This provides a cable system operator to provide additional upstream capacity to a return path combining as the penetration increases or additional services are offered.

The crossbar switch also provides the ability to do spectrum analysis by utilizing one unused PHY receiver to listen to all RF ports using the ICF block in the PHY receiver. To do this, the receiver is connected to each RF port one after the other and will scan all the possible channels to get the spectrum of the entire upstream frequency range.

Figure 1:
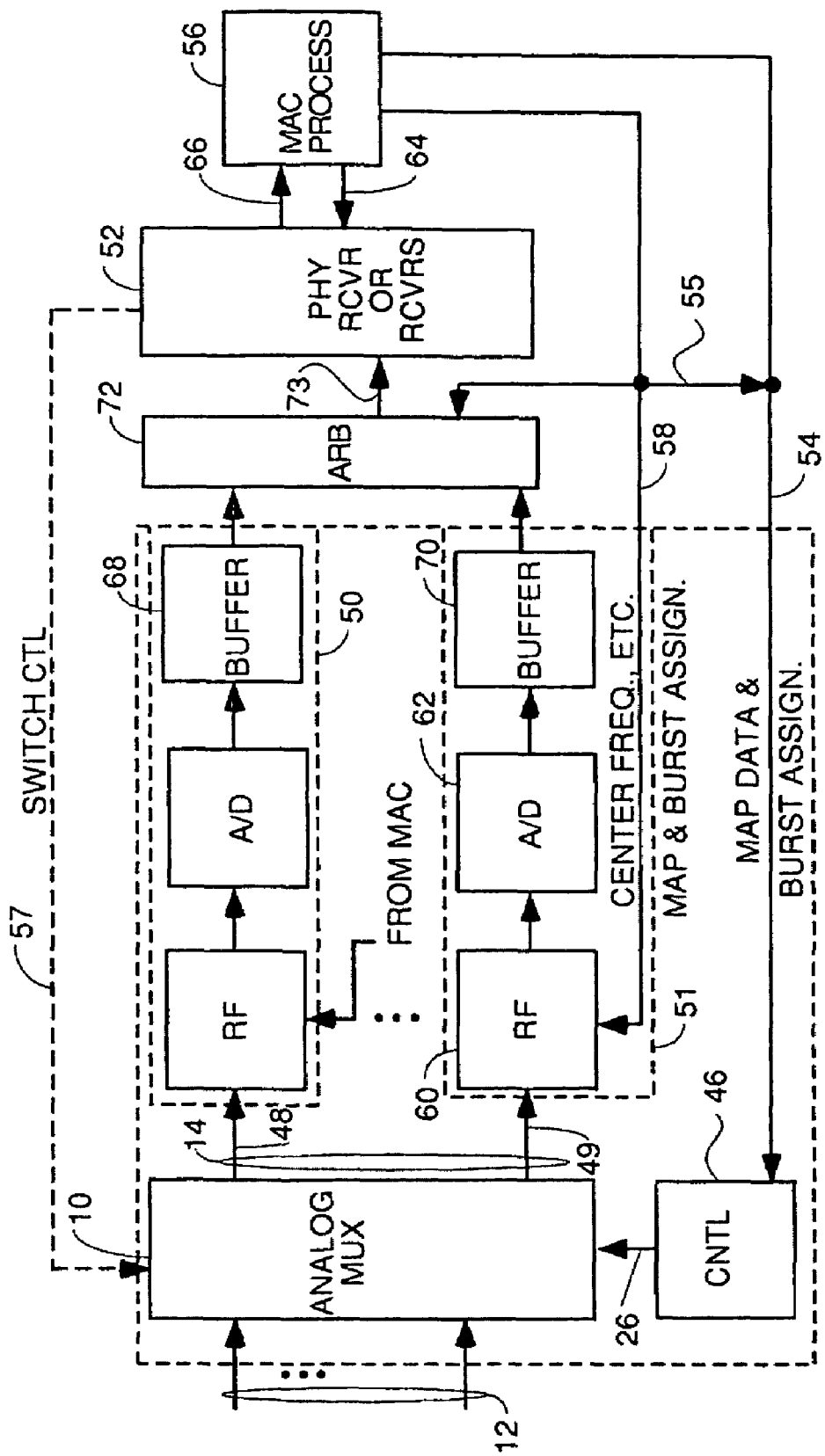
FIG. 1 is a block diagram of a buffered embodiment of a linecard with a shared single CMTS DOCSIS compatible receiver.
Figure 2:
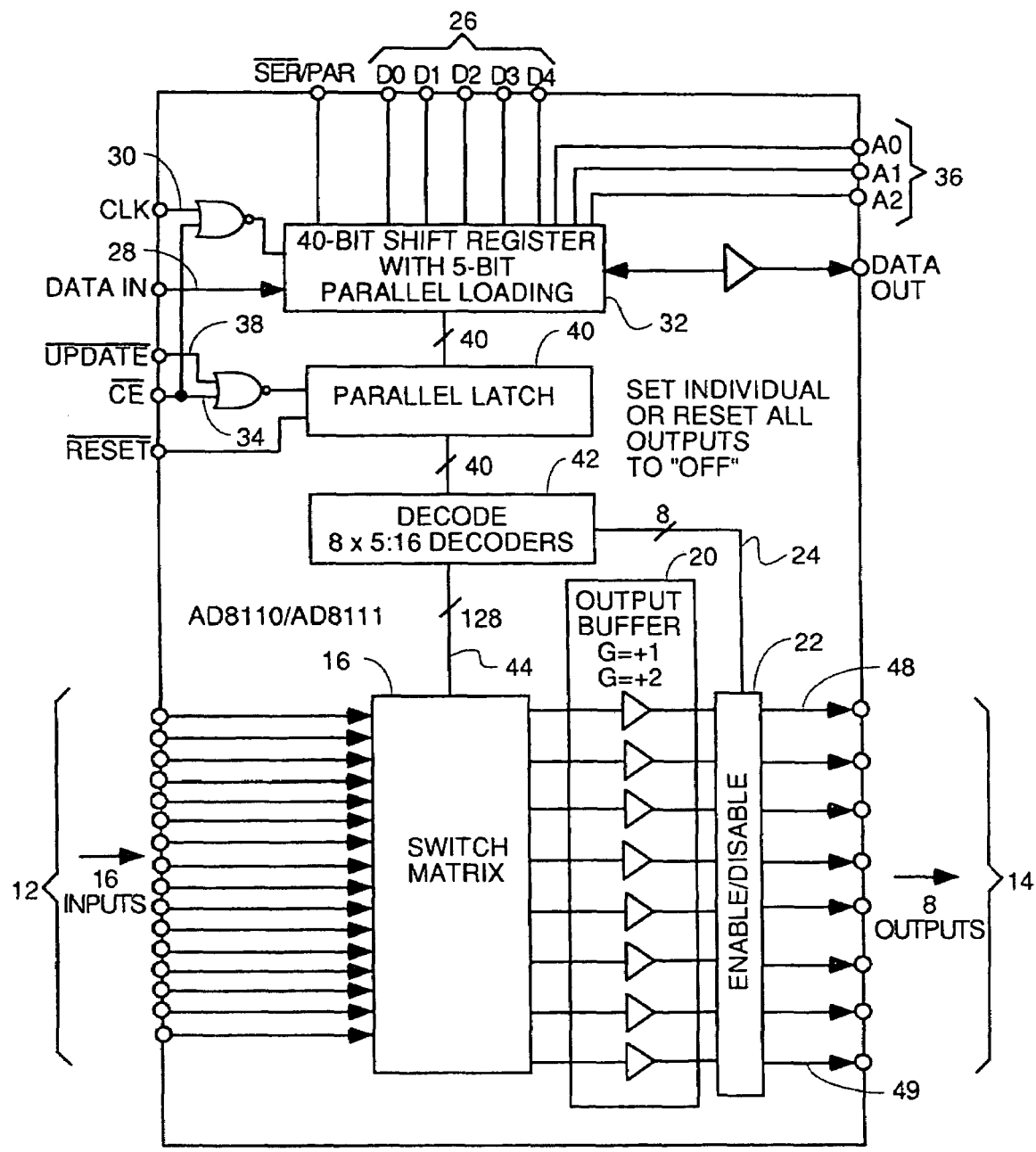
FIG. 2 is a block diagram of an upstream only line card with analog multiplexer front end.

Referring to FIG. 1 there is shown a block diagram of a buffered embodiment of the invention with a shared single CMTS receiver. A single analog multiplexer 10 has multiple inputs 12 which are coupled to a plurality of separate cable systems, with the individual cable systems numbered from 1 to N where N=16 in this embodiment. The multiplexer 10 is a commercially available integrated circuit from Analog devices. Either model AD8110 or AD8111 will work. A block diagram of the multiplexer 10 is shown in FIG. 2 which is jointly referred to. The multiplexer 10 has a plurality of outputs shown at 14, which are fewer than the number of inputs, where 8 outputs are used in the preferred embodiment. Any one of the outputs can be coupled through the switch matrix 16 in FIG. 2 to any one of the analog signal inputs shown at 18. Any of the plurality of outputs shown at 14 can be coupled to any one input or any combination of more than one input. In the preferred embodiment, there are eight outputs and sixteen inputs. Each output is buffered by a buffer amplifier in buffer array 20, and each output can be enabled or disabled by control data on bus 24.

Control of the switch matrix 16 is accomplished by input of control words either in parallel format on bus 26 or in serial format on input line 28. A serial data clock is supplied on line 30. A 40-bit shift register 32 with 5-bit parallel loading via bus 26 or serial loading via line 28 stores the control word initially. Each 5-bit control word portion is steered to the correct portion of the shift register by a three bit address supplied on bus 36. A chip enable signal on line 34 enables the multiplexer to receive control data on a system bus (not shown) either in serial or parallel format. An update signal input 38 receives a signal which controls latching of the 40-bit stored control word into a parallel latch 40. A decoder 42 decodes the control word in latch 40 and generates the appropriate control signals on bus 44 to control the switch matrix 16 and the enable and disable circuits 22.

Returning to the consideration of FIG. 1, the multiplexer 10 is controlled by control circuitry 46 to select the appropriate input cable(s) from the group of N input cables for coupling to the appropriate output(s) 14 at the appropriate time. This is done using MAP data and burst assignment data received on data path 54. In an alternative embodiment, represented by dashed line 55, PHY receiver 52 receives the MAP data and generates switch control data or signals on data path 55 which control switch 10 to select the appropriate input at the appropriate time to get samples of particular bursts to the PHY receiver. In embodiments where multiple PHY receivers are used, each PHY receiver generates control signals that control which input is coupled to a particular output of crossbar switch 10 which the PHY receiver is coupled to. In some such embodiments, the arbiter 72 can be eliminated and multiple PHY receivers each have an input coupled to one output of a sample buffer in an RF amplifier section. The MAP data is received from a Media Access Control (MAC) process 56 and, in embodiments where PHY receiver 52 is multiple receivers, the burst assignment data is received from arbiter 72. The arbiter receives MAP data from the UMAC process and determines which receivers will receive which bursts where there are multiple receivers. The arbiter sends burst samples to be processed along with burst assignment data and UCD data to the appropriate receivers via data path 73 if there are multiple receivers. The arbiter then also sends the burst assignment data via data path 55 (which becomes part of data path 54) to control circuit 46.

Where there is only one shared receiver, the arbiter simply determines which buffer 68 or 70 to select data from and supplies the data to the receiver via data path 73. In single receiver embodiments, the arbiter need not receive MAP data on data path 55 nor send burst assignment data to control circuit 46 and may simply decide which buffer to empty based upon the fullness status of the buffers. The arbiter may also do the appropriate address generation and control signal generation to control each buffer to supply samples to the arbiter for coupling to the input of the selected DOCSIS compatible PHY receiver such as 52.

The control circuit 46 using the MAP data, burst assignment data and upstream mini-slot counts for each logical channel to control switching by multiplexer 10. The upstream minislot counts can be kept either by one or more mini-slot counters in the control circuit 46 or by one or more mini-slot counters in the MAC process with the current mini-slot count for each input cable transferred to the control circuitry via data path 54.

Each of the outputs 14 is coupled to any known RF channel circuitry suitable for cable modem usage. Further, any known PHY layer CMTS receiver 52 can be shared by all the outputs and RF channels. In the embodiment of FIG. 1, output channel 1 at 48 is coupled to RF channel 50 and the output of the RF channel is coupled to a shared PHY layer CMTS receiver 52. Likewise, output 49 is coupled to RF channel 51.

The function of each RF channel 50, 51, etc. in the preferred embodiment is simply to amplify, digitize and buffer. Down conversion and filtering in a digital filter to select a particular upstream band is done in the PHY receiver in the preferred embodiment. An amplifier (marked RF) amplifies the entire received upstream band signal received at its input by a gain value established by the Media Access Control process so as to make use of the full dynamic range of the A/D converter (marked A/D). The amplified signal is then sampled, and the digital samples are stored in buffer 68, 70, etc. These samples are then processed by the shared PHY receiver where digital tuning is accomplished to the appropriate upstream logical channel upon which the burst to be processed was transmitted. Digital passband filtering with a filter which has its coefficients set to match the bandwidth of the burst according to its symbol rate is also performed in the PHY receiver 52 and there may be a down conversion to baseband in some embodiments.

The function of each RF channel 50 in an alternative embodiment is to tune to the appropriate upstream logical channel, mix down to baseband the selected RF logical channel on the input cable to which the output coupled to the RF channel is connected. The RF channel also filters out noise in some embodiments, and, in all embodiments, each RF channel digitizes the selected logical channel it is processing and buffers the burst data. Suitable RF channel circuitry for channel 50 and PHY receiver circuitry for receiver 52 is disclosed in U.S. Pat. No. 7,050,419, entitled "Head End Receiver for Digital Data Delivery Systems Using Mixed Mode SCDMA and TDMA Multiplexing," issued on May 23, 2006, and in U.S. Pat. No. 6,791,995, entitled "MULTICHANNEL, MULTIMODE DOCSIS HEADEND RECEIVER," issued on Sep. 14, 2004, both of which are owned by the assignee of the present invention, and both of which are hereby incorporated by reference. However, any other RF channel circuitry that can mix the selected channel down to baseband and filter out unwanted analog signals or data either before or after sampling by the analog to digital converter 62 will suffice to practice the invention.

In the buffered class of embodiments represented by FIG. 1, multiple bursts can be simultaneously processed in parallel in the RF channels such as RF channels 50 and 51, but the shared receiver 52 can only process one burst at a time in some embodiments or a couple of bursts at a time in other embodiments such as where the CMTS receiver has multiple pipeline stages each of which can process a burst while other stages are processing other bursts or where the CMTS receiver has a plurality of parallel circuit paths. Any CMTS receiver circuitry can be used as receiver 52. However, pipelined CMTS receivers are commercially available from Terayon Communications Systems, Inc. of Santa Clara, Calif. which have several pipeline sections and which are disclosed in the patent applications incorporated by reference herein. Each of these pipeline sections can be processing one burst while the other pipeline sections are processing other bursts. The RF channels buffer the sample data of the bursts they process in front end buffers such as 68 and 70 until an arbiter 72 supplies the selected burst data to the shared receiver 52. In species where the CMTS receiver 52 can only process one burst at a time, the arbiter 72 only supplies one burst at a time from the buffers using any suitable arbitration scheme such as bursts in buffers closest to overflow or highest service priority first or first-come-first served, or bursts encoding data from services that do not tolerate interruptions such as streaming video or audio first. In embodiments where the CMTS receiver can process more than one burst at a time such as pipelined receivers, the arbiter fills the first pipeline state of the receiver first and waits for that burst to be processed and move to the second pipeline stage, and then fills the first pipeline stage with data from another burst.

The function of the shared receiver 52 is to recover the data of each burst and to make measurements such as timing offsets necessary to communicate to the cable modems which transmitted the burst information they need to achieve upstream mini-slot boundary alignment. The receiver receives burst parameter data for each burst that defines how the receiver is to process the burst from the MAC process 56 via data path 64. Recovered payload data and measurements are supplied to the MAC process via data path 66.

Each logical channel can have various center frequencies and bandwidth in the upstream frequency range of the cable and each logical channel is transmitted during specific upstream mini-slots in Data Over Cable System (DOCSIS) compliant systems. The center frequency, bandwidth (symbol rate), modulation type, and assigned mini-slots (as well as other parameters) for each burst on each cable are controlled by a Media Access Control (MAC) process executing on a computer in the CMTS. The MAC process receives upstream bandwidth requests, assigns bandwidth according to some allocation scheme, and sends downstream bandwidth award (MAP) messages to the various cable modems (CM) that sent the bandwidth requests. The center frequency and bandwidth of each burst to be processed by an RF channel along with other parameters such as modulation type are supplied to the RF channel from the MAC process via data paths such as path 58 for RF channel 51 in embodiments where the RF channel includes a tuner and narrow passband digital filter. Each RF channel receives this information from the MAC process and receives the burst assignment information from the arbiter 72, all on data path 58 or separate data paths from the arbiter and the MAC process. The RF channels need the burst assignment data and the UCD and MAP data in multiple receiver embodiments only where each RF channel uses a tuner. This is so that each RF channel knows which logical channels to tune, the channel parameters and the appropriate time to tune to the channel and the frequency of the channel so they can set their local oscillator frequency to mix the received burst signal down to baseband. In the preferred embodiment, where the RF channel is not a tuner and is basically an amplification stage, line 58 can be eliminated as the MAP and UCD data is not needed.

In the buffered embodiment of FIG. 1 where RF tuners are used, the MAC process 56 controls the upstream bandwidth assignments in the MAP messages so that there can be overlap in time between bursts to be received on different cables regardless of which cable the burst is to be transmitted upon. This why the buffers are needed. The function of the control circuit 46 in multiple receiver embodiments is to: 1) receive MAP data from the MAC process and burst assignment data from the arbiter 72 via data path 54; 2) use one or more local upstream mini-slot counters either synchronized to the MAC upstream mini-slot counters or receive current upstream mini-slot counts from the MAC for each input cable via data path 54 so as to keep track of each cable's mini-slot number; 3) use the MAP data and the mini-slot counts for each cable to determine when to expect bursts; and 4) issue the appropriate control word on bus 26 to control the multiplexer 10 to select the input cable on which a burst is to be received and connect that input cable to an available one of the RF channels. In the preferred embodiment where RF tuners are not used, these above enumerated four functions are done in the PHY receiver. In the RF tuner embodiments, each RF channel then receives the appropriate control data from the MAC process 56 via a data path such as data path 58 to mix the selected logical channel down to baseband, filter it (in some embodiments), and digitize the channel and buffer the samples. Each RF channel in the preferred embodiment where RF tuners are not used has RF amplifier 60 and analog-to-digital conversion circuitry 62 as well as a buffer 70.

The RF circuits in all the embodiments disclosed herein are comprised of known filtering and mixing circuitry to filter out noise outside the bandwidth of the logical channel upon which a burst is to be received, mix the RF signal down to some intermediate frequency and do other processing.

Typical front end circuitry in the RF tuner embodiments includes a passband filter to filter out most noise outside the 6 MHz bandwidth of interest followed by a variable gain amplifier/attenuator which is controlled by a gain control circuit. The gain control circuit controls the amplifier/attenuator so that the RF signal entering an analog-to-digital converter has a nominal power set by the cable operator so as to utilize the full dynamic range of the A/D converter without exceeding its range of linearity. The front end AGC circuit has the structure disclosed in U.S. patent application Ser. No. 09/999,060, filed Nov. 15, 2001, which is hereby incorporated by reference. Basically, it comprises a power measurement circuit to measure the power in the samples on bus 72. The power measurement circuit is coupled to a control word generator and a loop filter. The loop filter is coupled though a mode switch to a control word register. The control word generator is coupled to a sigma-delta modulator to generate an analog control signal on line 21 based upon the value of the control word. An analog filter filters the generated analog signal to smoothen it. Most embodiments of the RF circuitry in RF tuner embodiments then mix the filtered RF signal down to some intermediate frequency suitable for filtering by a variable passband filter which has its passband bandwidth set according to the symbol rate of the logical channel being received. In the preferred embodiment, this is done in the PHY receiver. Some logical channels may not have a symbol rate that is fast enough to consume the entire 6 MHz channel, so a variable bandwidth passband filter is adjusted to have whatever bandwidth for its passband is established by the symbol rate of the burst to be received. In the RF tuner embodiments, this is done in the RF tuner at the front end. In the preferred embodiment, this is done in the PHY receiver. The frequency of a local oscillator which feeds the mixer is set according to UCD information defining the center frequency of the logical channel to be received. This UCD information also sets the symbol rate and controls the bandwidth of the variable bandwidth passband filter.

Each input cable can have its own mini-slot count synchronized to a mini-slot counter in the MAC process dedicated to that cable. However, all the cables can also use a unified mini-slot count. The control circuit 46 keeps track of the mini-slot count on each cable regardless of where the mini-slot counters are and whether each cable has its own mini-slot count. The control circuit 46, in the preferred embodiment, keeps the MAP data for each input cable in a table and utilizes comparison circuitry to compare the current mini-slot count for each input cable to the MAP data to determine when a burst will arrive on each input cable. This comparison circuitry can be hardwired comparators or a programmed microprocessor. When a burst is about to arrive, an appropriate control word is generated on bus 26 (which can be in either serial or parallel format) which controls multiplexer 10 to connect the appropriate input cable to an RF channel circuit which is available. The control word generation can be by a decoder or a programmed microprocessor. The control circuit includes circuitry to keep track of which RF channel has been assigned to each burst and when that channel will be available based upon the duration of the burst as determined from the MAP data for the appropriate input cable. In this way, the control circuitry knows which RF channels are busy, and which are available for purposes of determining which radio frequency output 14 to couple to the radio frequency input 12 upon which the expected burst will be arriving.

Figure 3:
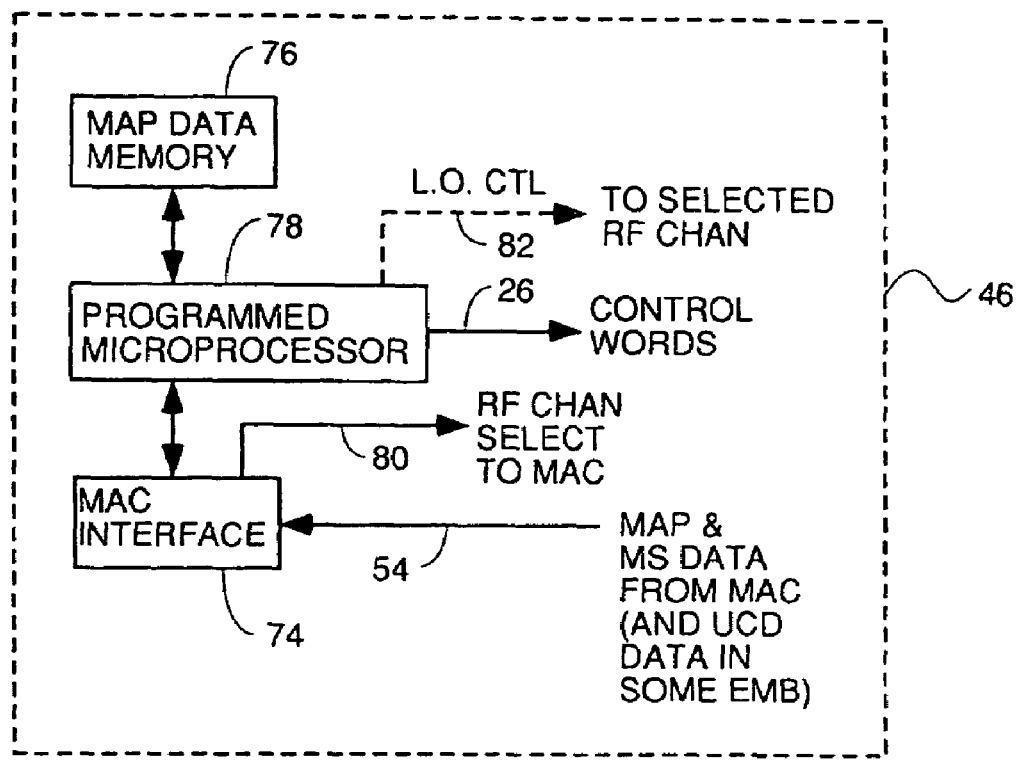
FIG. 3 is a block diagram of one embodiment of a control circuit for the line card of FIG. 1.

FIG. 3 is a block diagram of one embodiment for control circuit 46. In this embodiment, the upstream mini-slot count and the MAP data for each input cable is received via the MAC interface 74 and data path 54. The MAC interface has a structure which depends upon the nature of the data path 54. Data can be transferred by a parallel or serial format bus, a wireless or wired LAN or WAN link, by shared memory or any other interprocess transfer mechanism. The MAP data is stored in a memory 76 by microprocessor 78. Preferably, each input cable has a dedicated block of addresses in memory 76 in which the MAP data is stored. The current mini-slot count for each cable may also be stored in memory 76 or in on-board memory or registers in microprocessor 78. The microprocessor 78 is programmed to constantly compare the current mini-slot count for each input cable to the MAP data indicating when the next burst will be arriving for that input cable, and when the mini-slot count approaches the mini-slot number of the next expected burst, for generating an appropriate control word and control signals on bus 26 to control the analog multiplexer to connect the appropriate input cable to the appropriate output. The appropriate output is determined from an RF channel availability table the microprocessor 78 maintains indicating which RF channel has been assigned to each burst and how many mini-slots each said burst is scheduled to last from the MAP data for the burst. Before generating the control word, the microprocessor consults this RF channel availability table to select an available RF channel. In some embodiments, after selecting an RF channel, this information is transmitted back to the MAC process 56 via the MAC interface and data path 80 which can be the same data path upon which the incoming MAP and mini-slot data is received. This allows the MAC process to know to which RF channel to send UCD data for the burst defining the logical channel's center frequency and any other burst parameters needed by the RF channel's circuitry such as sample rate.

In alternative embodiments, the MAC process sends the UCD data for each logical channel's burst to the microprocessor 78 via data path 78. The microprocessor 78 then generates the appropriate frequency control word to control the frequency generated by a local oscillator in the RF channel circuit selected to process a particular burst to mix the burst's radio frequency signal down to baseband. This embodiment is represented by dashed line 82 carrying a local oscillator frequency control signal to a local oscillator frequency control word input of a local oscillator (not shown) of the selected RF channel input.

Figure 4:
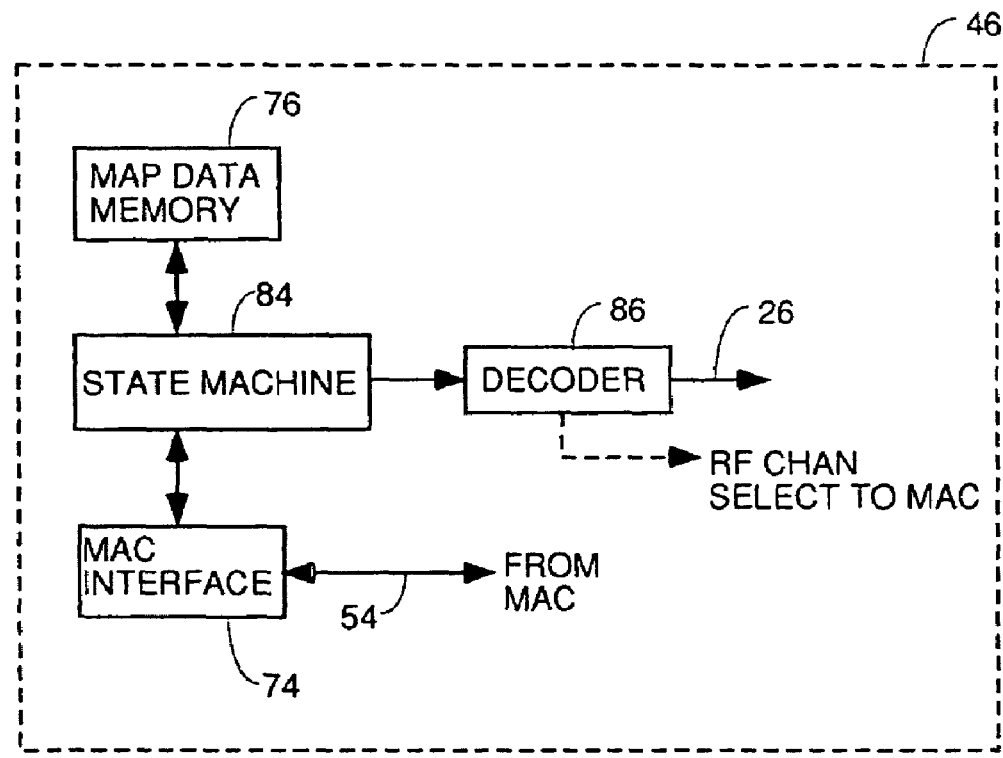
FIG. 4 is a block diagram of another embodiment of a control circuit for the analog multiplexer.

In other alternative embodiments, all the functions of the MAC interface and/or microprocessor 78 can be implemented in a state machine, as represented by FIG. 4, or glue logic including comparators, address generators, decoders, UARTs or parallel bus interfaces or other equivalent circuitry depending upon the embodiment for the interface to the MAC and the RC channel's local oscillator circuitry, e.g., does the RC channel local oscillator require a digital frequency control word such as is required by a direct digital synthesizer or an analog frequency control signal such as where a phase lock loop is used. In FIG. 4, all circuits having the same reference numbers as circuits in FIG. 3 perform the same function. The function of the microprocessor 78 is performed by state machine 84 and decoder 86. The state machine constantly checks MAP data against the current mini-slot counts for each cable, and when a burst is about to arrive, selects an available RF channel from a channel availability table it maintains. Then a control word is generated on bus 26 by a decoder 86 from output signals from the state machine. Data about which RF channel has been selected is supplied to the MAC process 56 by the state machine via the MAC interface 74 or directly from the decoder 86.

Figure 5:
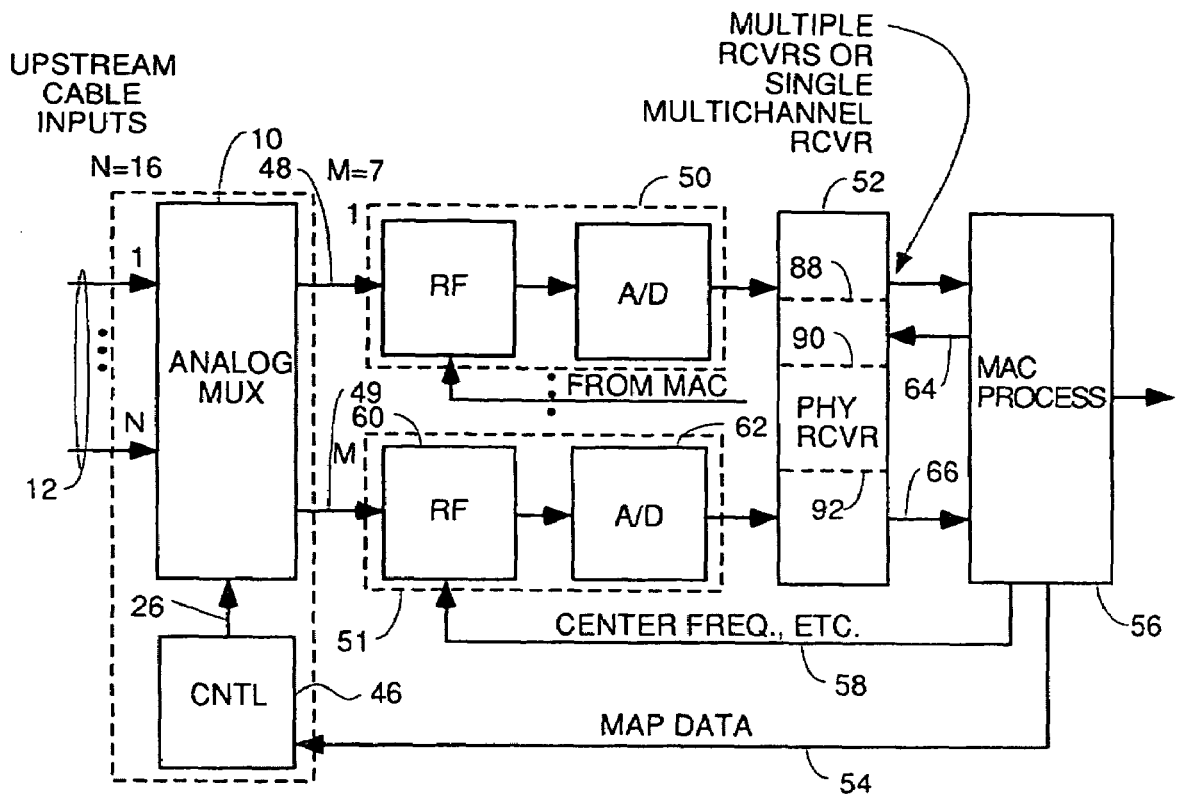
FIG. 5 is a block diagram of an embodiment of an analog multiplexer based front end with multiple bufferless RF channel circuits and either a single CMTS receiver which can process multiple bursts simultaneously or multiple CMTS receivers, each dedicated to processing the output from one RF channel circuit.

Referring to FIG. 5, there is shown a block diagram of a bufferless analog multiplexer front end where the CMTS receiver 52 is capable of parallel processing of multiple bursts simultaneously. All circuits having the same reference numbers as circuits in FIG. 1 have the same structure and function in the combination and have the same alternative embodiments. The analog multiplexer 10 receives control data on bus 26 from control circuit 46 which control which one or more of the plurality of outputs exemplified by 48 and 49 are connected to which one or more of the inputs 12. Each output is coupled to an RF channel circuit, each of which is comprised of an RF circuit 60 and an analog-to-digital sampler 62. In the RF tuner embodiments, the RF circuit 60 mixes the selected logical channel down to baseband and filters out unwanted signals. The A/D sampler preferably does wide band sampling. Each RF channel circuit in RF tuner embodiments receives control data which defines the center frequency of the selected logical channel which is modulated with the data of the burst to be processed. This data controls the frequency of a local oscillator signal generated by a local oscillator (not shown) in the RF circuit 60 which feeds a mixer to mix the burst's RF signal down to baseband. This control data can be received from the MAC process 56 as symbolized by data paths 58 to RF channel 51 and a similar data path to RF channel 50, or, in alternative embodiments, it can be received from the control circuit 46.

The RF channel circuits exemplified at 50 and 51, each output their bursts sample data on separate outputs coupled to a CMTS receiver 52 capable of processing multiple bursts simultaneously such as in parallel processing paths which share some common circuitry that can be shared. In alternative embodiments, the CMTS receiver block 52 is actually a separate CMTS receiver for each RF channel circuit, as symbolized by dashed lines 88, 90 and 92.

The control circuit 46 either has its own upstream mini-slot counters for each input cable synchronized to corresponding upstream mini-slot counters in the MAC process 56. In an alternative embodiment, the control circuit can have one upstream mini-slot counter synchronized to a corresponding upstream counter in the MAC process 56 if all the input cables have their upstream mini-slot counters synchronized to the same upstream mini-slot counter in the CMTS MAC process 56. In other alternative embodiments, the control circuit 46 receives the upstream mini-slot count for all the input cables 12 from the MAC process via data path 54.

In this embodiment of FIG. 5, there can be overlap in time between bursts on different cables as well as overlap in time between bursts on the same cable which are on different logical channels whose bandwidths do not overlap. There can also be multiple bursts on the same logical channel during different time division multiplexed intervals. The control circuit receives MAP data on data path 54 from the MAC process which defines which bursts are arriving on which input cables during which mini-slots and how long each burst is. The control circuit stores this MAP data and compares the MAP data for each cable to that cable's upstream mini-slot count to determine when each burst is about to arrive so that appropriate control words can be generated on bus 26. The control circuit keeps track of which RF channel circuits are available, and selects one to process each burst and generates appropriate control data on bus 26 to connect the correct input cable to the input of the selected RF channel. In some embodiments, the control circuit informs the MAC process 56 of each assignment of an RF channel and the timing of same so that the MAC process can send the appropriate UCD message data to the RF channel circuit to control the generation of a local oscillator signal to mix the burst down to baseband. In RF tuner embodiments, the control circuit receives the MAP and UCD data and generates the control signals which control the frequency of each RF tuner circuit's local oscillator. In RF tuner embodiments where unwanted RF signals are filtered out by the RF channel circuit, either the MAC process 56 or the control circuit 46 will also send the symbol rate to the RF channel that processes each burst so that it knows the bandwidth of the burst and can set its filter coefficients properly to maximize the eliminated unwanted RF signals outside the bandwidth of the burst being processed. In the preferred embodiment, this variable bandwidth passband filtering is done in the PHY receiver.

Figure 6:
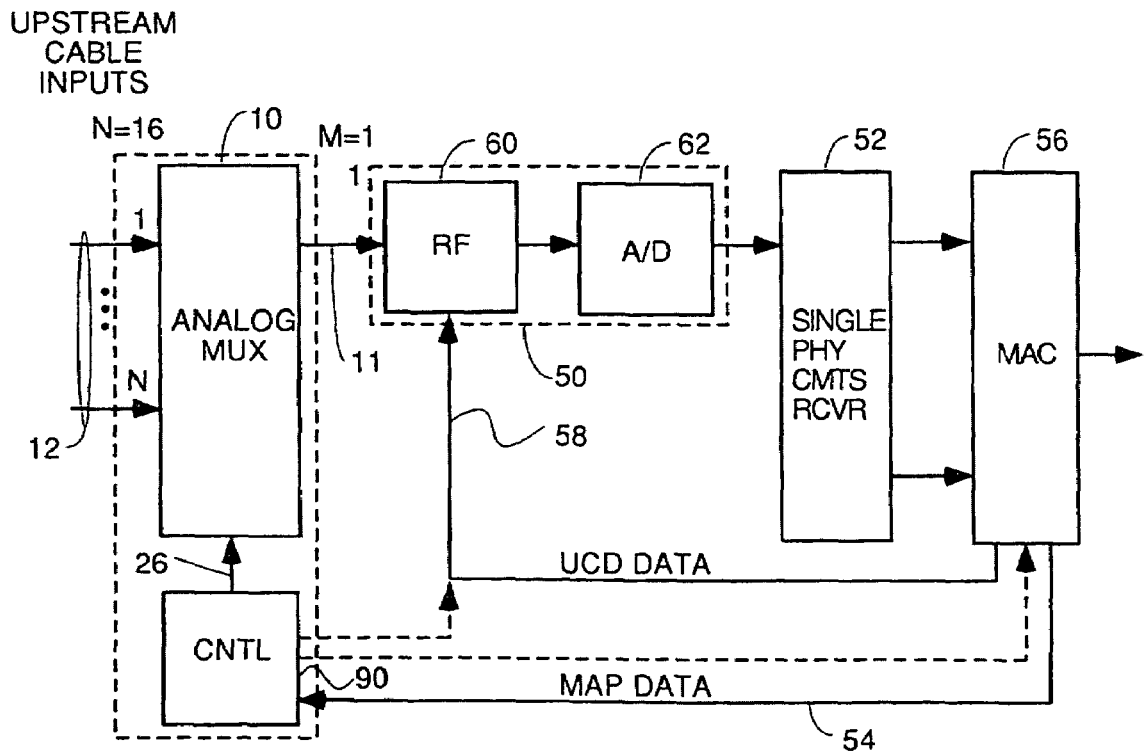
FIG. 6 is a block diagram of a bufferless embodiment of an analog multiplexer front end with a single RF channel circuit and a single CMTS receiver.

Referring to FIG. 6, there is shown a block diagram of an analog multiplexer front end for a CMTS receiver where only a single bufferless RF channel circuit is used. In the embodiment of FIG. 6, the analog multiplexer 10 has multiple input cables and a single output 11 which is coupled to the input of a single RF channel circuit 50. In the embodiment of FIG. 6, the MAC process is limited to grants in MAP messages such that there is no overlap in time between logical channels on the different input cables because there is no buffer and only one shared receiver. The RF channel circuit can be an RF tuner type embodiment or an RF amplifier type embodiment. In the RF tuner type embodiment, the RF channel includes at least an RF circuit 60 which mixes the selected burst down to baseband and an analog-to-digital converter 62 which samples the baseband signal. In alternative RF tuner embodiments, the RF channel circuit also includes a tunable digital or analog filter to remove noise outside the bandwidth of the burst being received. The RF channel circuit has an input 58 at which control data is received either from the MAC process 56 or the control circuit 90. This control data defines the center frequency of the logical channel to be received so that a local oscillator in the RF channel circuit can generate the proper frequency to mix the selected burst down to baseband. The control data can also include the symbol rate of the selected burst to define its bandwidth. This symbol rate data is used in embodiments of the RF channel circuitry which include RF tuners and narrowband, adjustable bandwidth digital passband filters following A/D conversion to set the coefficients of the digital filter or otherwise control the rolloff frequency or passband frequency limits so that the RF signal of the logical channel carrying the selected burst gets through and most noise outside the bandwidth of that logical channel is filtered out.

The control circuit 90 is structured to receive MAP data on data path 54 and store it and to either count upstream mini-slots on each input cable synchronously with upstream mini-slot counters in the MAC process 56 for the corresponding input cable or to receive the current mini-slot count for each input cable from the MAC process via data path 54 and store that in memory or just use the current mini-slot count of each cable in an ongoing round robin process of comparing the MAP data for the next expected burst on each input cable to the current mini-slot count for that cable. Control circuit 90 is different than the control circuits of FIGS. 1 and 5 since there is only one RF channel circuit and the control circuit 90 does not have to keep data indicating which of a plurality of RF channel circuits is currently available. The hardware structure of the control circuit 90 can be the same as in FIGS. 3 and 4, but the program is modified to not maintain data regarding the availability of an RF channel before generating control data to control the switching of the multiplexer 10. The process carried out by the control circuit 90, once it determines that a burst is about to arrive on a particular input cable, is simply to generate control word data on bus 26 which causes the multiplexer 10 to connect that input cable to the RF channel circuitry in time to process the burst.

Figure 10:
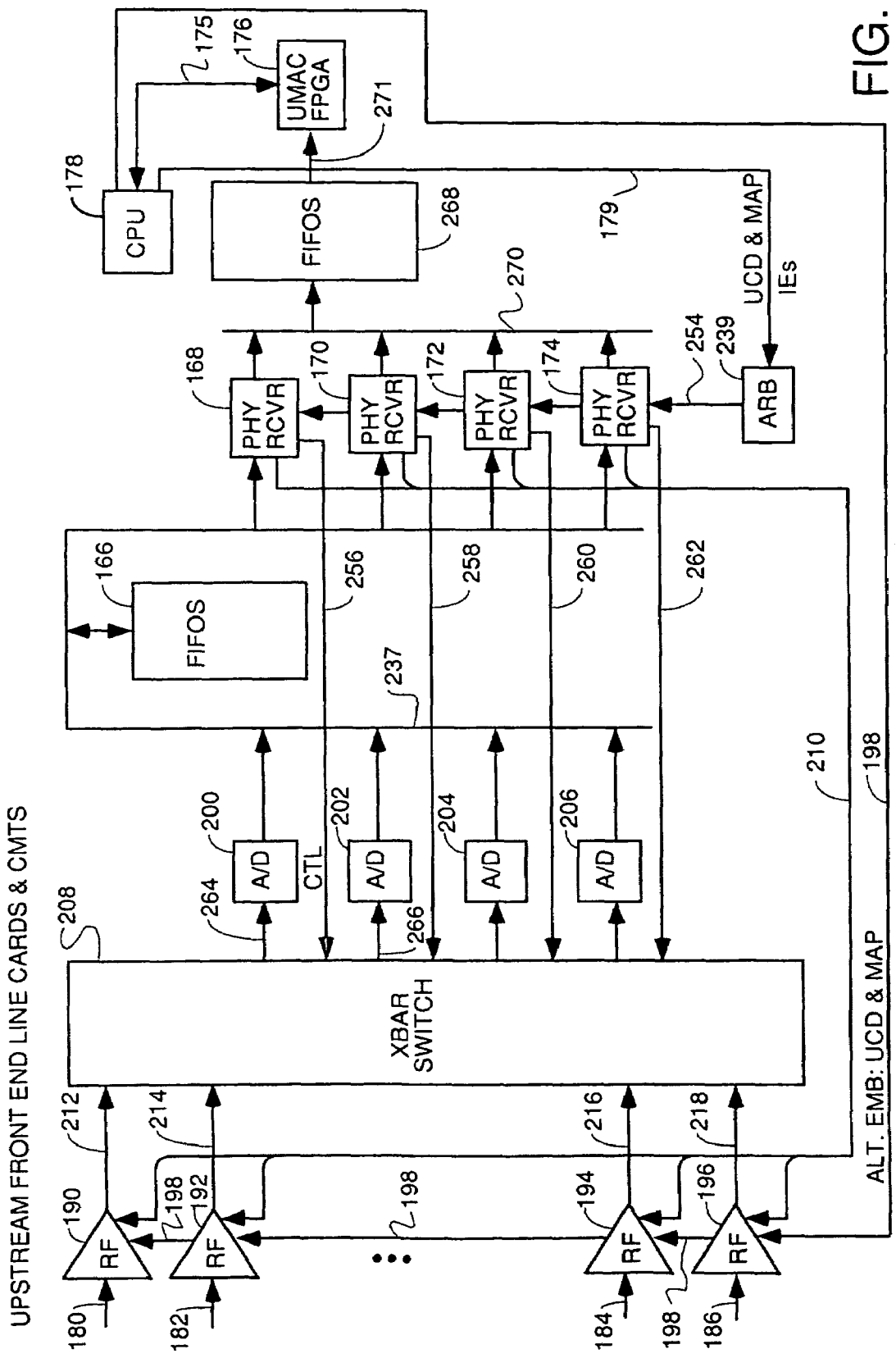
FIG. 10 is a block diagram of the preferred form for a CMTS front end with a digital crossbar switch, multiple PHY receivers, and separate FIFO memories at the input and output of each PHY receiver so as to provide maximum flexibility to the UMAC process in scheduling bursts.

Referring to FIG. 7, there is shown a block diagram of one embodiment for a digital front end multiplexer arrangement for a CMTS where the analog-to-digital conversion on upstream signals occurs before the switching function carried out by digital crossbar switch 126 and two PHY receivers are shared amoung all the inputs. The embodiment of FIG. 7 has no buffer memory to store overlapping bursts (bursts which arrive on different inputs from different optical nodes but which overlap in time). However, since two shared PHY receivers are available, at least two overlapping bursts can be scheduled by the MAP messages transmitted on the downstreams to which the cable modems are tuned which are coupled to the optical nodes coupled to inputs 100 through 116 (a group). The addition of FIFO memory after the switch 126 and before the PHY receivers, such as is shown in FIG. 10, adds additional capacity to process overlapping bursts in both non contention and contention intervals. If there is no memory after the switch (or before the switch in some embodiments), the MAP messages for the group must be coordinated so that there is never any more overlapping burst authorizations than there are outputs of the switch and shared receivers.

In FIG. 7, each of N input cables 100 through 116 from one or more HFC systems is coupled to one of the inputs of the multiplexer system via some RF channel circuitry of which 122 is typical. Each of the cable inputs is coupled to a radio frequency analog signal processing circuit such as 118 which can have the same structure described above with reference to RF circuit 60 in FIG. 1 or any of the structures described or referenced below. The function of the RF circuit is to prepare a radio frequency burst signal bearing upstream data for analog-to-digital conversion. This involves filtering out excess noise and gain control adjustment to utilize the entire dynamic range of the A/D converter while not exceeding its limits of linearity. In some embodiments, down conversion to baseband or some intermediate frequency is used sometimes followed by another passband filtering step using a variable passband filter having its passband set to the bandwidth established by the symbol rate of the burst to be received. The RF circuits again come in two different classes: RF tuner classes which tune specific upstream logical channels; and RF amplifier embodiments which just amplify the entire upstream band and depend upon the PHY receiver to process the samples to extract data from bursts transmitted on specific upstream logical channels. In the RF tuner embodiments, the RF channels receive UCD and MAP data on bus 124 from the upstream media access control (UMAC) circuit 150 for each logical channel on the cable to which the RF circuit is coupled. The MAP data defines when a burst to be tuned to will occur, and the UCD data defines for each burst to be received the center frequency and symbol rate of the burst so the RF receiver can tune to the appropriate logical channel at the appropriate time. The RF circuit in RF tuner embodiments can also tune the frequency of its local oscillator for down conversion to the IF frequency or baseband, if down conversion is used, and set the passband bandwidth of its passband filter using this UCD information in embodiments where down conversion and variable passband filtering is used. In the preferred embodiment, the RF channel is just a wideband amplifier that amplifies the entire upstream bandwidth signal using a gain control number supplied by either the PHY receivers 138, etc. or the UMAC process 150 so as to efficiently use the dynamic range of the A/D conversion. No down conversion or filtering is done in the RF sections 118 etc. in these embodiments.

The RF circuit outputs its analog signal to an A/D converter 120 which samples at a fixed sample rate in the preferred embodiment which is high enough to satisfy the Nyquist criteria for the highest frequency burst to be received. In some RF tuner embodiments, the A/D function can be part of the RF circuit 118, and the RF circuit does not do down conversion at all or does down conversion after the A/D conversion. Down conversion can be to an intermediate frequency in some embodiments and to baseband in other embodiments. In an embodiment using downconversion after A/D conversion, a digital mixer having a direct digital synthesis (DDS) local oscillator may be used to down convert the incoming RF signal's frequency to the IF frequency. The DDS frequency can be controlled by a control word generated by the MAC process based upon the UCD data of the logical channel whose burst is to be received. The output of the down converter can be processed in such an embodiment by an interpolator to re-sample at the correct clock rate for the burst being received. The output of the interpolator can be processed by a variable decimator to get rid of excess samples for lower symbol rate bursts. The decimator uses the UCD data symbol rate information to determine how many samples to remove for each burst to reduce the amount of processing necessary by the PHY receiver chips.

In some embodiments, the output of the variable decimator can be processed by any known narrow band excision circuit (not shown in FIG. 7) to rid the signal of narrow band interference.

A digital crossbar switch 126 is controlled by a control circuit 128 to couple the each input (130 and 132 are typical) to the appropriate output (134 and 136 are typical) at the appropriate time so that samples that encode each burst will be connected to a CMTS upstream PHY receiver chip (138 and 140 are typical—hereafter PHY receiver) which has been assigned to receive the burst. In some embodiments, the PHY receivers receive the UCD and MAP information from the MAC process via bus 152 for all the upstream logical channels and information from the MAC process or an arbiter process assigning each PHY receiver to receive particular bursts on particular upstream logical channels (hereafter just channels). In other embodiments, each PHY receiver will receive only the MAP and UCD information for bursts the PHY receiver has been assigned to process.

In some embodiments, each PHY receiver controls switching of the particular output of the crossbar switch to which it is coupled. In such an embodiment, represented by dashed lines 160 and 162 which would take the place of control bus 142. In such an embodiment, the control circuit 128 takes the form of an arbiter or burst distributor which receives MAP data on data path 164 from the UMAC process and communicates with the PHY receivers on data paths 144 and 146 to determine which PHY receivers are available to process bursts. In some embodiments, the control circuit 128 does not need to inquire as to the status of each PHY receiver because the control circuit assigns bursts to each PHY receiver, knows how long the bursts are from the MAP data and how long it will take the PHY receivers to process each burst assigned to it. Based upon this information, the control circuit 128 can create a table of availability and assign bursts defined in the MAP data according to this table. The control circuit 128 then sends these burst assignments to the PHY receivers via data paths 144 and 146. Each PHY receiver then uses the MAP data it receives on data path 152 and these assignments to generate control signals on data paths 160 and 162, respectively, to cause the crossbar switch to switch at the proper time to connect the input at which the assigned burst will arrive to the output connected to the PHY receiver so the burst is directed to the assigned PHY receiver.

In the embodiment shown in FIG. 7, a control circuit 128 communicates with each PHY receiver via a bidirectional data path shown at 144 and 146, and the control circuit 128 keeps a table of which PHY receivers are busy and which are available. The control circuit then sends messages to each PHY receiver telling it which bursts it has been assigned to receive and generates control signals on control bus 142 which control switching of the crossbar switch 126 at the proper time to couple the assigned bursts to the PHY receiver assigned to process them.

Each PHY receiver programs itself to receive the particular burst type which it has been assigned to receive using the UCD data. A typical PHY receiver is disclosed in PCT publication number WO03/107570 published Dec. 24, 2003, which is hereby incorporated by reference, but any PHY layer DOCSIS 1.x or 2.0 compatible receiver will suffice to practice the invention. Upstream clock timing is recovered and measurements are made of frequency, timing and power offsets and upstream equalization coefficients during training bursts. These measurements are sent with recovered data and recovered upstream messages to upstream media access control circuit (MAC) 150 via buses 154 and 156. The UMAC circuit 150 implements the DOCSIS training and registration protocols by cooperating with a downstream MAC (DMAC) circuit which is not shown. The measurements are used to compose and send downstream DOCSIS messages on bus 158 to the DMAC process for transmission downstream to the cable modems which sent the training bursts to allow them to make frequency, power and timing adjustments for subsequent transmissions to achieve precise synchronization and to set the coefficients of their upstream equalization filters to equalize the upstream channel.

Figure 8:
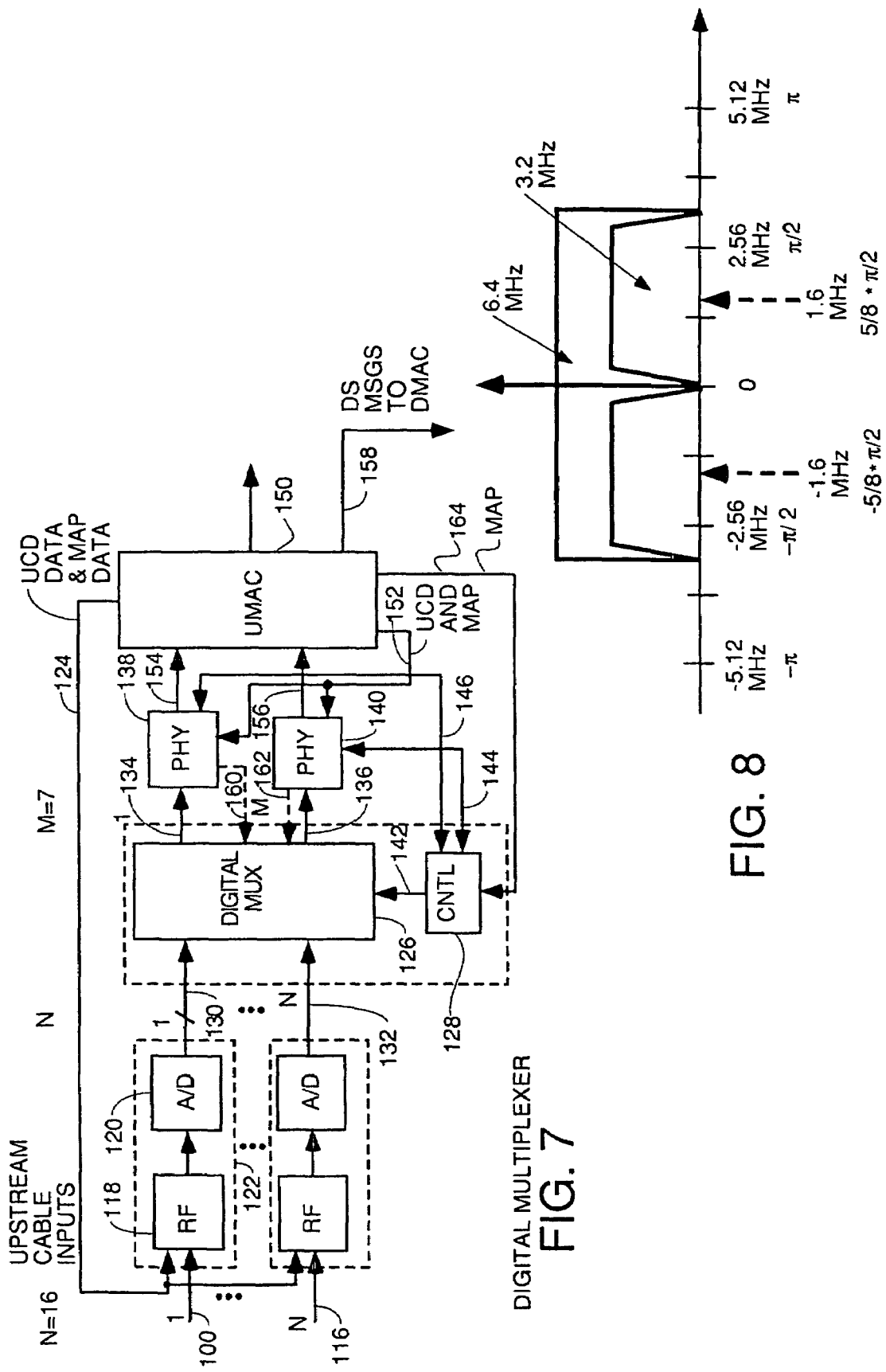
FIG. 8 is a diagram of two smaller upstream logical channels that have non overlapping bandwidth that share the bandwidth of a 6.4 MHz upstream logical channel.

The UMAC process generates a downstream UCD and MAP message for each upstream logical channel. Upstream cables may be more than one logical channel as the upstream frequency band for Euro DOCSIS is 5-65 GHZ and the US DOCSIS upstream is from 5-42 MHz. With 6 MHz bandwidth logical channels, each cable may have several separate upstream logical channels. Further, each 6 MHz wide frequency slot may be further subdivided into smaller bandwidth logical channels such as is illustrated in FIG. 8. FIG. 8 shows a single 6 MHz wide frequency slot subdivided into two adjacent 3.2 MHz wide logical channels that share the 6 MHz wide channel but do not themselves overlap in bandwidth. These smaller bandwidth channels have slower symbol rates and different center frequencies. Bursts on these channels can be transmitted simultaneously, and the two bursts can be routed to different receivers by simultaneously connecting the same input to both outputs 134 and 136. The receivers then each individually process the same samples to extract different bursts.

Figure 9:
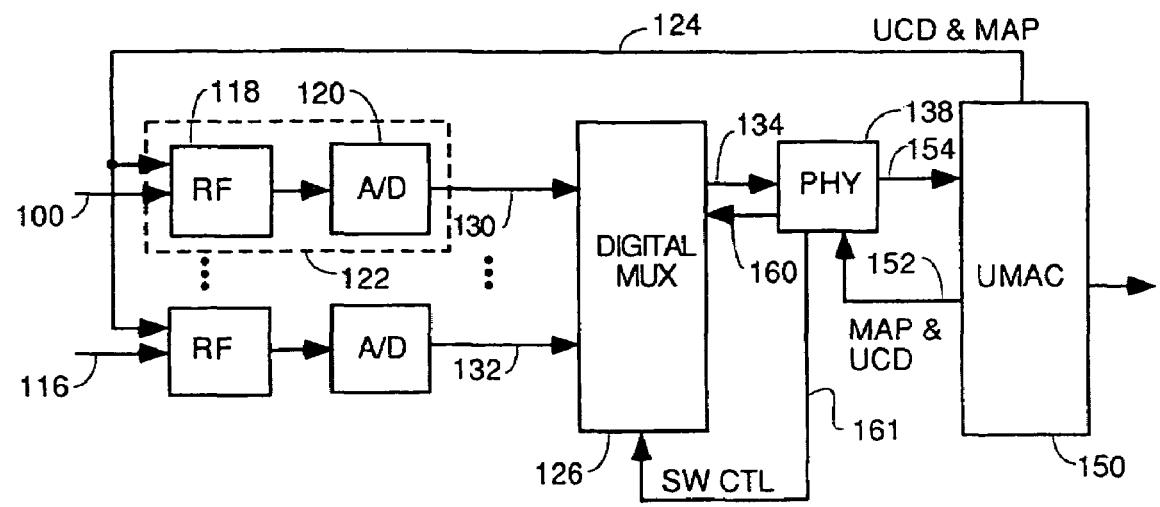
FIG. 9 is a diagram of a bufferless embodiment of a bufferless embodiment of a digital front end multiplexer-based upstream line card CMTS which couples bursts of multiple upstream channels to one shared upstream receiver called PHYs.

Referring to FIG. 9, there is shown a block diagram of a single shared PHY receiver embodiment with a digital multiplexer and A/D conversion in front of the digital multiplexer. In the embodiment of FIG. 9, all the circuits with like reference numbers to circuits in FIG. 7 have the same structure and function, and there can be RF tuner embodiments which receive the MAP and UCD data or RF amplifier only embodiments which do not receive the MAP and UCD data, all as previously described. The main difference is that there is only one shared PHY receiver to process all bursts so there is no need for a control circuit to assign different bursts to different PHY receivers or keep a table of PHY receiver availability. The single PHY receiver receives the UCD and MAP data on data path 152 from the UMAC circuit 150 and generates control signals for digital multiplexer 126 on bus 161 to control the switching of various ones of inputs such as 130 or 132 to output 134 at the proper time so that each burst can be received by PHY receiver 138 and its data recovered and supplied to UMAC circuit 150 on output 154. The UMAC circuit 150 generates MAP messages for the various upstream logical channels so that there is no overlap in time of bursts since there are no buffers in the embodiment of FIG. 9 and only one receiver that is shared.

Referring to FIG. 10, there is shown a block diagram of the preferred form for a CMTS front end with a crossbar switch, multiple PHY receivers, and separate FIFO memories at the input and output of each PHY receiver so as to provide maximum flexibility to the UMAC process in scheduling bursts. The embodiment of FIG. 10 can be either a single upstream line card or the entire upstream CMTS depending upon whether the inputs 180 through 186 are all the upstream cables the CMTS needs to deal with or not. The embodiment of FIG. 10 uses a plurality of first-in, first-out (FIFO) memories represented by block 166, one FIFO for every PHY receiver. There are four PHY receivers shown at 168, 170, 172 and 174, each capable of receiving DOCSIS 1.x bursts, DOCSIS 2.0 SCDMA or ATDMA bursts when properly programmed with the UCD data of the upstream logical channel on which the burst is transmitted. In the preferred embodiment, each PHY receiver is capable of processing only one burst at a time. In alternative embodiments, each PHY receiver will be pipelined and will be able to process more than one burst at a time.

The UMAC process performed by the UMAC FPGA 176 and microprocessor or other computer 178 is conventional in all the embodiments disclosed herein except that MAP data information elements granting bandwidth to cable modems coupled to the input cables of the digital switch must be coordinated in each embodiment as specified below in the discussion of each embodiment. Basically, this coordination involves scheduling bursts from the various CMs coupled to the optical nodes which are coupled to inputs 180, 182, 184 and 186, etc. so that, during non contention intervals, there is either no overlap in time or the overlap in time of bursts arriving from different optical nodes is such than no more than four bursts from four different optical nodes can arrive simultaneously at any time. That is because there are only four outputs of switch 208 and four FIFOs. If there were five or three or six or any other number, the limitation would be that there can be no more simultaneoulsy arriving bursts than there are FIFOs to store them.

There may be multiple simultaneously arriving bursts from different optical nodes coupled to inputs 180, 182, etc. during contention intervals such as training and bandwidth request intervals. The crossbar switch is informed of when these contention intervals are by control signals on switch control lines 256 from the PHY receivers (which receive MAP data from the UMAC process). During contention intervals, the crossbar switch, in some embodiments, goes into an autonomous mode and senses energy on its inputs. When energy is sensed on an input, that input is coupled to one of the outputs 264 etc. which is available. In this way, no more than four simultaneously arriving bursts during contention intervals will be coupled to the four outputs.

The UMAC process prepares UCD message data to define each upstream logical channel. The UCD message for each channel assigns channel parameters such as center frequency, symbol rate, modulation type, spreader on or spreader off, etc. These parameters define each upstream logical channel to be transmitted on the HFC cable inputs to the system. The UMAC process also defines the MAP data for each logical channel that defines when each cable modem may transmit a burst on a particular upstream logical channel. The MAP data must be coordinated according to how many PHY receivers there are and whether FIFO buffer capacity is or is not present, as explained more fully below.

The cable inputs, of which 180, 182, 184 and 186 are typical, can be part of one or more HFC systems, and bring bursts of upstream payload data and DOCSIS upstream message data modulated on radio frequency signals from a plurality of different optical nodes to a plurality of radio frequency (RF) sections, of which 190, 192, 194 and 196 are typical.

In the preferred embodiment, these RF sections are not really tuners and tuning to specific logical channels is done in the PHY receivers. They are gain controlled amplifiers and, in some embodiments, the RF sections include wideband filters. The amplifiers amplify the entire frequency band of the upstream (5 to 65 or 5 to 42 MHz depending upon whether in the US or Europe) at a gain level set by gain control information output by the PHY receivers 168 etc. on data paths 210. The wideband filters suppress noise outside the upstream band limits. Each PHY receiver controls the gain of several RF sections through separate outputs coupled to lines within data path 210. The gain control numbers are controlled by the PHY receivers so that the maximum dynamic range of the A/D converters 200 etc. can be utilized and so that the bursts arrive at the receivers 168 etc. at a desired power level.

In this preferred embodiment, the desired burst or bursts (no more than four simultaneously arriving bursts) are selected by crossbar switch 208 using switching control signals on lines 256, 258, 260 and 262 from the PHY receivers 168 etc. The selected burst or bursts are coupled to the outputs 264 etc. such that each A/D converter 200 etc. gets coupled to no more than one input 180 etc. at any particular time. The A/D converters sample the entire upstream bandwidth, and the samples are stored in one of the FIFOs in block 166 dedicated to that particular channel. The PHY receiver assigned to that particular burst then digitally tunes the filter coefficients of a digital passband filter inside the receiver so as to establish a passband centered on the center frequency of the upstream channel on which the burst arrived and having a bandwidth established according to the symbol rate of the burst. That center frequency and symbol rate information of the assigned channel and burst is communicated to the receiver by the arbitration circuit 239 which receives the information in UCD and MAP messages from the UMAC process. In some embodiments, the PHY receiver uses the center frequency of the band of interest to control the frequency of a down conversion signal generated by a digital local oscillator that is used to digitally mix with the incoming samples to move the upstream channel of interest down to baseband where the channel is filtered and decimated according to its sample rate/bandwidth as determined from the UCD data.

In alternative RF tuner embodiments of the assignee, the RF sections are true tuners which are frequency nimble and can tune to specific upstream logical channels and suppress signals outside the bandwidth of the selected logical channel. These RF sections function to tune to the appropriate upstream logical channel at the appropriate time to receive a burst and filter out noise according to UCD and MAP data received from the UMAC process on line 198, and amplify or attenuate as needed for best conversion to digital samples by the A/D converters. The resulting signal is output to one of the inputs 212, 214, 216 or 218, etc. of the crossbar switch 208. The RF tuner sections can be any of the structures described herein and also function, in some embodiments, to down convert to baseband in some embodiments.

In some embodiments, the A/D conversion is done in the RF sections or A/D converters are coupled to receive and sample the analog outputs of the RF sections such as 190 and output samples to inputs of a digital crossbar switch. In these embodiments, the A/D converters 200, 202, 204 and 206 can be eliminated. In RF tuner embodiments where the A/D conversion is done in the RF section, digital passband filters with variable passband bandwidth are included after the A/D conversion in each RF section to filter out noise outside the frequency limits of the selected upstream logical channel. In some embodiments, these digital passband filters use the center frequency of the upstream logical channel on which a burst is arriving and the symbol rate of the burst to set their filter characteristics to filter out noise outside the bandwidth of the particular logical channel of interest. However, the more preferred embodiment is to use a mixer and local oscillator having its frequency set using UCD information to mix the logical channel down to baseband. In other words, the UCD information on the center frequency of the upstream logical channel to be tuned is used to set the frequency of the local oscillator. Then a variable passband, digital low pass filter has its filter coefficients set to establish a rolloff at the upper frequency edge of the selected logical channel.

The PHY receivers in the preferred embodiment, where tuning to specific logical channels in done in the PHY receivers, receive the UCD and MAP data they need to tune their tuners, and set the passbands of their variable bandwidth passband receivers via bus 179 or 241 or 280 depending upon the embodiment in question. In alternative species where RF tuners are used, a bus 198 is coupled to each RF section and carries UCD and MAP from the UMAC process implemented by FPGA 176 and CPU 178. Each RF tuner in these RF tuner embodiments can receive all the UCD and MAP data for all logical channels in some embodiments and just use what it needs or just the UCD and MAP data for the upstream logical channels on its particular cable in other embodiments.

The UCD data contains the center frequency of each logical channel and allows the RF tuner in RF tuner embodiments to tune to a selected logical channel and any local oscillator present for a down conversion stage can use the center frequency of the selected logical channel to set its frequency for the desired frequency for down conversion of the logical channel to IF or baseband. In some embodiments, down conversion occurs, but in the preferred embodiment, no down conversion is performed in the RF tuners so the entire RF spectrum (after passband filtering) is sampled and stored in the appropriate FIFO for processing by the PHY receivers. However, in the preferred embodiment, variable bandwidth passband filtering or down conversion to baseband and variable bandwidth low pass filtering is done, and it is easier done in the digital domain. Therefore, this processing is done in the PHY receivers 168 etc. instead of the RF sections. Thus, in the preferred embodiment, the RF sections 190, 192 etc. are only wideband gain control amplifiers. Also, in the preferred embodiment, the A/D conversion is done after the crossbar switch so that only four A/D converters are needed instead of one for every RF section. In this preferred embodiment, the RF sections such as 190 may, in some embodiments, also use a coarse passband filter that filters out all noise outside the band limits of the entire upstream (5-65 MHz for Euro-DOCSIS and 5-45 MHz for US DOCSIS). In this preferred embodiment, the particular frequency limits of any particular logical channel are ignored by the RF section.

The RF sections do have to amplify or attenuate the signal to prepare it for A/D conversion so as to use the full dynamic range of the AND converters but not exceed their range of linearity. The A/D converters are shown at 200, 202, 204 and 206, each having a signal input coupled to an output of a crossbar switch 208. Each A/D converter samples at a constant rate which is high enough to satisfy the Nyquist criterion. The gain of each RF section is controlled by one of the PHY receivers. Each PHY receiver has four separate gain control outputs in the preferred embodiment, each of which is coupled to a gain control input of one of the RF sections 180 through 186 via data path 210. Data path 210 represents individual data paths from each of the PHY receivers gain control outputs to one of the gain control inputs of one of four different RF sections. Thus, in the preferred embodiment, each PHY receiver can only be assigned to receive bursts from one of the cables coupled to one of the four RF sections for which the PHY receiver controls the gain.

The PHY receivers are assigned to receive bursts by an arbiter circuit 239. The arbiter receives UCD and MAP Information Element (IE) data from the CPU 178 (or FPGA 176) via data path 179. The arbiter keeps track of which receivers are processing bursts and which are available and assigns bursts according to availability to keep the load balanced. In some embodiments, the arbiter also keeps track of the state of fullness of each FIFO in memory 166 and assigns bursts so as to not overflow the FIFO. In such an embodiment, the FIFOs will have information regarding their read and write pointers sent to the arbiter 239. The same holds true for the embodiment of FIG. 11.

The CPU 178 cooperates with and controls a UMAC field programmable gate array 176 to carry out an upstream media access control (UMAC) process. The IE data defines when each burst will arrive and which input cable the burst will arrive upon. The CPU 178 controls the FPGA via signals and/or configuration data sent on control path 175. The UMAC process implements DOCSIS training and registration protocols. This is done by performing such functions as generating downstream messages inviting cable modems (CM) to send training bursts, and receiving measurements made by the PHY receivers on training bursts of timing, frequency and power offsets of the training bursts for each CM and upstream equalization coefficients. The UMAC process then sends downstream messages to each CM that is training that include these offsets and equalization coefficients to assist each CM in achieving precise synchronization on the upstream logical channel to which it is assigned. After each CM has successfully trained, it registers with the UMAC process as a CM in the system through DOCSIS registration messages. The UMAC process cooperates with a downstream media access control process, not shown to carry out these known protocols.

One of the functions of the UMAC process is to establish the channel parameters of each upstream logical channel, assign CMs to logical channels and to receive upstream bandwidth requests and make bandwidth awards in downstream MAP messages. Each upstream logical channel has its own UCD message and its own MAP messages. The UCD message defines where the logical channel is and various parameters of the types of bursts that may be transmitted on it. The MAP message contain grants which define when each burst can be transmitted. This UCD and MAP data is sent to an arbiter 239 which decides which PHY receiver is to receive each burst. The arbiter then sends messages via data path 254 to the PHY receivers telling them which bursts they have been assigned to receive and giving them at least the UCD data and, in some embodiments, the MAP data for the bursts they are assigned to receive so that they can configure themselves at the proper time to receive each burst. The PHY receivers need to configure themselves differently to receive DOCSIS 2.0 SCMDA bursts versus DOCSIS 1.x TDMA bursts.

Each PHY receiver then configures itself properly to receive the bursts to which it has been assigned and generates the proper control signals to control switching by the crossbar switch to guide the assigned burst to the PHY receiver. In the preferred embodiment, each PHY receiver has a control output which is coupled to a switching control input of the crossbar switch. Those control outputs are shown at 256, 258, 260 and 262. Control signals on data path 256 are generated by PHY receiver 168 to control which of inputs 212, etc. are coupled to output 264. Likewise, PHY receiver 170 generates control signals on data path 258 to control which input 212, etc. is coupled to output 266 and so on for each of the four outputs of the crossbar switch. The switching control signals are generated by each PHY receiver to cause switching of the crossbar switch at the proper time to couple the input at which the assigned burst appears to the output coupled through an A/D converter to the PHY receiver assigned to process the burst.

The PHY receivers also generate gain control words on a data path (part of data path 210) coupled to the gain control input of the RF section coupled to the cable upon which the assigned burst will be received. This causes the RF section to amplify or attenuate the burst signal for best use of the dynamic range and linearity of the A/D converter.

The bursts are then sampled by the A/D converters 200, 202, 204 and 206 at a sample rate which is high enough to satisfy the Nyquist criteria for the highest frequency logical channel that could be encountered. This generates too many samples for some logical channels, so the PHY receivers include decimators to reduce the number of samples to the amount needed to speed up processing.

The sample streams output by the A/D converters are coupled on separate data paths represented by line 237 to FIFOs dedicated to storing the output of each A/D converter. In other words, each A/D converter 229 through 235 is coupled by its own data path to the input of a FIFO in memory 166 dedicated to storing the output samples of that A/D converter. In alternative embodiments, line 237 represents a local area network, and each A/D converter and the FIFOs have network interface cards to interface to the LAN. In such an embodiment, each A/D converter packetizes its samples and addresses them to the appropriate FIFO dedicated to it.

The FIFOs 166 store the burst samples until the PHY receivers have time to process them. There is a separate FIFO for each A/D converter. But data from multiple logical channels can be simultaneously stored in the same FIFO. The FIFOs provide flexibility to the UMAC process executed in CPU 178 and FPGA 176 to generate MAP messages without worrying about time overlaps in bursts assigned to the same receiver but sent on different logical channels. The FIFOs also allow the MAP messages for the logical channels to be created without concern about overrunning the capacity of the receivers to process the bursts as long as the average amount of burst data arriving does not exceed the capacity of the PHY receivers to process it. The FIFOs smooth out the peaks in burst data and fill in the valleys so the PHY receivers can be used most efficiently. The foregoing is true for both the embodiments of FIGS. 10 and 11.

Each FIFO has an output coupled to the input of one PHY receiver. The PHY receivers access the FIFOs and read the data when they are ready to process the burst. Processing of each burst occurs in a prior art fashion such as is described in the PCT publication incorporated by reference herein. Each PHY receiver recovers payload data and DOCSIS message data from the bursts and makes measurements on training bursts. Each PHY receiver also develops upstream equalization coefficients by an iterative process of processing training burst data to equalize the channel. These measurements and equalization coefficients are sent to the UMAC process through a set of dedicated FIFOs represented by block 268 and a set of dedicated data paths represented by line 270. There is one FIFO for each PHY receiver. The FIFOs store the recovered payload data and measurement data and message data until the UMAC FPGA 176 has the chance to read it. The recovered data stored in the FIFOs 268 is output by separate data paths or one combined data path to the UMAC FPGA 176 for processing.

Figure 11:
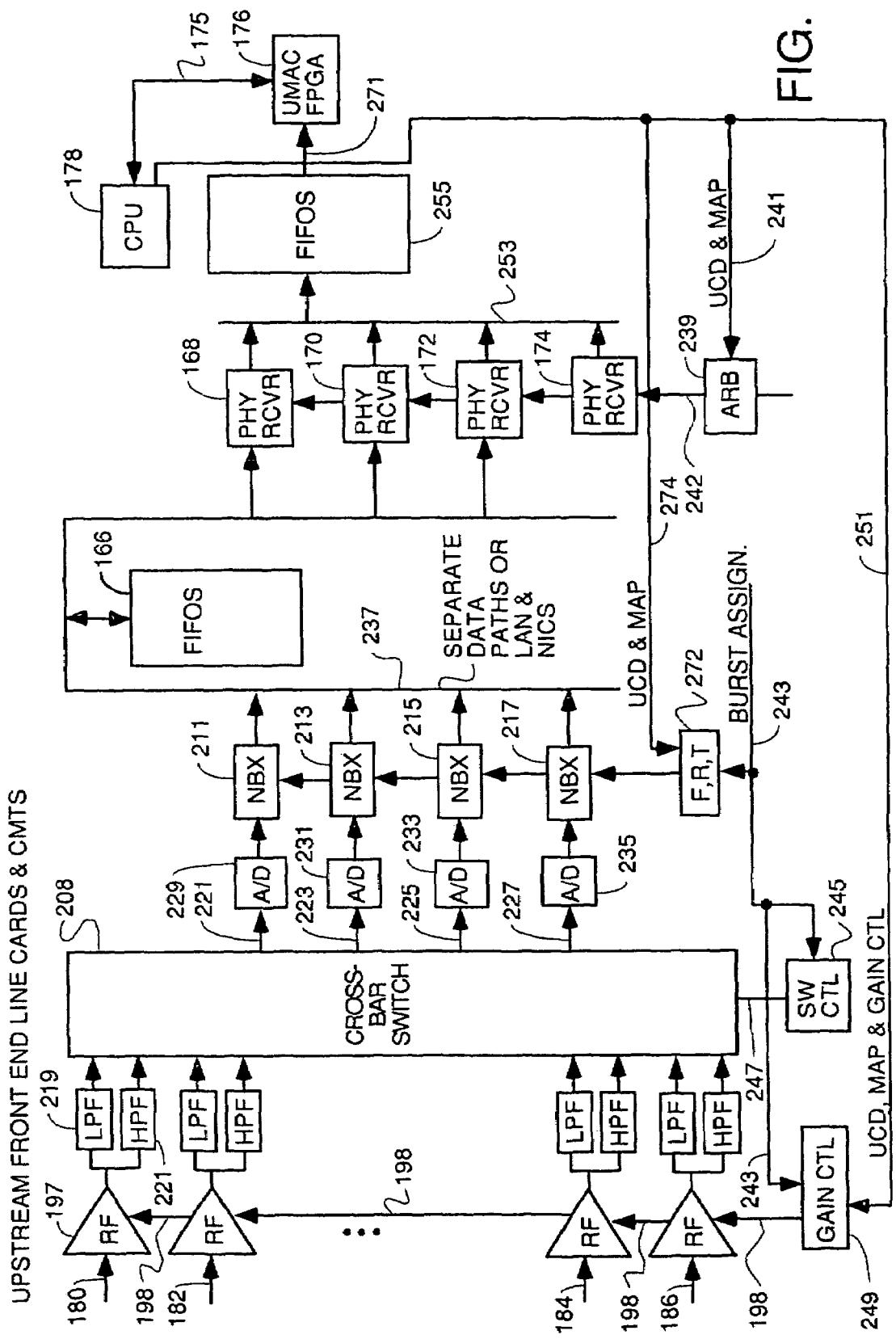
FIG. 11 is a block diagram of an alternative embodiment for the upstream line card/CMTS receiver.

Referring to FIG. 11, there is shown an alternative embodiment of the upstream line card/CMTS of FIG. 10. Each cable input 180 through 186 (typically there are 16 cable inputs) comes from a different optical node of one or more HFC systems. Again there are two classes of embodiments: a class where the RF sections 197 are tuners; and a class of embodiments where the RF sections are just wideband gain control amplifiers. The RF tuner embodiments have their RF tuners and passband filters controlled to tune to a particular upstream logical channel and suppress noise outside its bandwidth at the appropriate time to receive each burst. The UCD and MAP data needed by the RF tuners in the tuner embodiments is supplied by control circuit 249 from data is receives from the UMAC process on line 251. The control circuit receives the burst assignment data via data path 243. The UCD and MAP data is supplied to all the circuits in the CMTS upstream line card which need that information by CPU 178 which cooperates with UMAC FPGA 176 to carry out the UMAC process.

In the preferred class of embodiments, the RF sections such as 197 are not tuners and just include wideband amplifiers that amplify the received signals according to a gain supplied on bus 198. Some species within this class also then use a wide passband filter to suppress noise outside the upstream band limits. In alternative embodiments, the RF sections are actual tuners as described elsewhere herein which tune to specific upstream logical channels, mix down to baseband, and filter according to symbol rate, etc.

UCD and MAP information are supplied to arbiter 239 by CPU 178 via data path 241. The arbiter decides which bursts will be processed by which PHY receivers and supplies the appropriate UCD and MAP data to each receiver via data path 242 along with messages telling each PHY receiver which bursts it is assigned to process.

The burst assignment data is also supplied by the arbiter 239 via data path 243 to the switch control circuit 245 and NBX controller 272 (which also gets UCD and MAP data) in FIG. 11 but not in FIG. 10 where the PHY receivers themselves control switching by the crossbar switch 208. The switch control circuit 245 uses the burst assignment data on data path 243 to generate switch control signals on data path 247 to control switching by the crossbar switch 208 such that noise aggregation is avoided by avoiding summing of signals and just coupling the specific bursts at the specific times to the assigned receiver. The CPU 178 also generates gain control data for the RF sections and that data plus UCD and MAP data is supplied via data path 251 to control circuit 249 and appropriate configuration data is supplied from the control circuit 249 via data path 198 to each RF section to configure it properly at the correct time to receive each burst defined by the MAP data.

The embodiment of FIG. 11 uses narrow band excision filters and splits the spectrum of each cable into two halves using a high pass filter and a low pass filter. For example, the spectrum of cable 180 is split into an upper half and a lower half by high pass filter 221 and low pass filter 219, respectively. Splitting the band into two halves allows slower, less expensive A/D converters to be used to sample the lower frequency half of the 5-65 MHz band.

Each filter feeds a separate input of the crossbar switch 208 (references to crossbar switch should be understood to mean any digital switch capable of coupling inputs to outputs at the proper time to deliver assigned bursts to the PHY receiver assigned to receive them). Each of these inputs can be separately switched to any of the outputs 221, 223, 225 or 227 for A/D conversion by A/D converters 229, 231, 233 and 235. Each of these A/D converters samples at a fixed sample rate as was the case for FIG. 10, and the output sample streams are processed by narrow band excision circuits 211, 213, 215 and 217 to remove narrow band interference. Narrow band excision (NBX) circuits are known in the art. One example is taught in U.S. Pat. No. 6,426,983 which is hereby incorporated by reference. The NBX function does not have to be performed at the output of the A/D converters. In alternative embodiments of the embodiment of FIG. 10, the NBX function is performed in the PHY receivers 168, 170, 172 and 174, or not at all.

Each NBX filter circuit receives control data which assists it to do its function from control circuit 272. The narrow band excision process is performed on a logical channel which is at most 6.4 MHz wide in bandwidth in DOCSIS systems. Yet, the A/D converters 229 are performing wide band sampling in sampling the entire frequency band from 5-65 MHz for Euro-DOCSIS. The control circuit 272 receives UCD data and MAP data on line 274 from the CPU 178 or FPGA which together are executing the UMAC process. It also receives burst assignment data on bus 243 which defines each burst assigned to be received by a PHY receiver will be arriving. The control circuit then supplies the frequency of the logical channel on which will be transmitted each burst to be processed by a PHY receiver, the sample rate of the burst and the time it will be arriving to the narrow band excision circuit in the channel of the PHY receiver which has been assigned to process the burst. Each narrow band excision circuit has a processing section in front of the narrow band excision functionality that receives the frequency, sample rate and burst assignment timing data from control circuit 272. The processing section then down converts the digital representation of the entire upstream band output by the A/D converters using the center frequency of the logical channel upon which a burst to be processed is arriving so that the center frequency of the logical channel is at baseband (zero frequency) or some other frequency selected so that the logical channel does not fold back over on itself. This is done before the assigned burst arrives. The sample rate data is then used to decimate the samples of the logical channel to obtain a more reasonable number of samples per symbol, such as two. This speeds the system up by eliminating extra processing of excess samples which are unneeded. The burst assignment timing data is used to make sure all this happens at the right time for each assigned burst.

The filtered sample streams output by each NBX circuit are coupled by separate data paths represented by data path 237 to separate FIFOs for each logical channel, represented by block 166. These sample streams of each logical channel are processed by PHY receivers 168, 170, 172 and 174 to extract the payload and message data therefrom. The PHY receivers have the same structure as the PHY receivers in FIG. 10 except that they do not have the gain control circuitry to control the gain of the RF section amplifiers and they do not have circuitry to output control signals to control switching by the crossbar switch 208. Each PHY receiver is coupled by a data path 237 to the FIFO memories. Typically, each FIFO memory will have its own output coupled to a data path. In some embodiments, each PHY receiver is coupled to all the data paths and just enables the appropriate data path for input for the FIFO storing the data of the upstream logical channel which transmitted the burst the PHY receiver has been assigned to process. In other embodiments, each PHY receiver has a multiplexer at its input having one input coupled to the PHY receiver digital sample stream input and having one input coupled to each data path. The arbiter 239 controls switching by each multiplexer to couple the appropriate FIFO to the PHY receiver input when needed to process a burst. In other embodiments, data path 166 may be a local area network, and every circuit coupled to it may be coupled by a network interface card (NIC). In such an embodiment, each circuit with a NIC will have a software process which will know where each sample stream of a burst is supposed to go and will packetize and address the data packets accordingly, i.e., for storage in the proper FIFO 166 or addressed to a particular PHY receiver from the FIFO.

The PHY receivers output the data they recover and store it via separate data paths represented by line 253 in a FIFO in block labeled 255. This block represents one FIFO for each PHY receiver.

An arbiter circuit 239 received UCD and MAP data from the UMAC field programmable gate array 176 or CPU 178 via data path 241. The arbiter circuit determines in any way which PHY receiver is to process each burst on each logical channel identified in that channels MAP data. The arbiter keeps the upstream minislot count or gets if from the UMAC process for each upstream logical channel. The arbiter then sends a message to each PHY receiver at a time just before the assigned burst is scheduled to arrive at the CMTS giving the PHY receiver the details of the burst the receiver is assigned to receive including the appropriate MAP data indicating when the burst interval will be in terms of the upstream minislot count of the upstream logical channel and the UCD configuration data that defines the channel and burst parameters so that the PHY receiver can properly configure itself to receive the burst. The arbiter then sends appropriate data on data path 243 to a switch control circuit 245 to cause it to generate appropriate switching commands on data path 247 to cause the crossbar switch 208 to coupled the appropriate input to the appropriate output to get each burst to the PHY receiver assigned to receive it.

Figure 12:
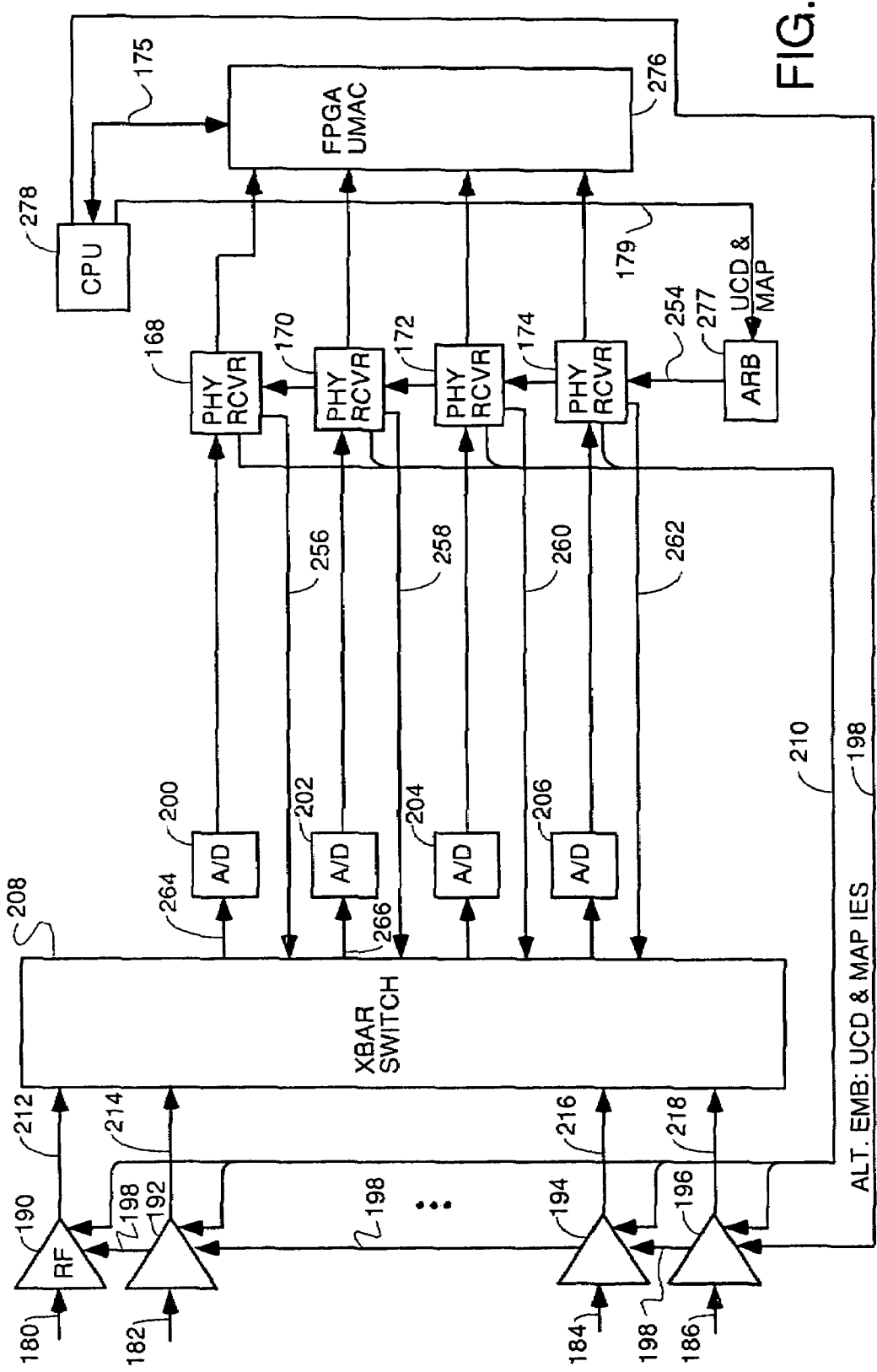
FIG. 12 represents an alternative embodiment of an upstream line card without FIFOs at the inputs or outputs of the PHY receivers.

FIG. 12 represents an alternative embodiment of an upstream line card without FIFOs at the inputs or outputs of the PHY receivers. As was the case for the embodiment of FIG. 10, a plurality of upstream inputs 180, 182 etc. from different optical nodes are coupled to a plurality of RF sections. In the preferred embodiment, these RF sections are not really tuners. They are gain controlled amplifiers and wideband filters. The amplifiers amplify the entire frequency band of the upstream (5 to 65 or 5 to 42 MHz depending upon whether in the US or Europe) at a gain level set by gain control information output by the PHY receivers 168 etc. on data paths 210. The wideband filters suppress noise outside the upstream band limits. Each PHY receiver controls the gain of several RF sections through separate outputs coupled to lines within data path 210. The gain control numbers are controlled by the PHY receivers so that the maximum dynamic range of the A/D converters 200 etc. can be utilized and so that the bursts arrive at the receivers 168 etc. at a desired power level.

In this preferred embodiment, the desired burst or bursts (no more than four simultaneously arriving bursts) are selected by crossbar switch 208 using switching control signals on lines 256, 258, 260 and 262 from the PHY receivers 168 etc. The selected burst or bursts are coupled to the outputs 264 etc. such that each A/D converter 200 etc. gets coupled to no more than one input 180 etc. at any particular time. The A/D converters sample the entire upstream bandwidth, and the samples are transmitted directly to the sample input of a PHY receiver dedicated to that particular channel. The PHY receiver assigned to that particular burst then digitally tunes the filter coefficients of a digital passband filter inside the receiver so as to establish a passband centered on the center frequency of the upstream channel on which the burst arrived and having a bandwidth established according to the symbol rate of the burst. That center frequency and symbol rate information of the assigned channel and burst is communicated to the receiver by the arbitration circuit 239 which receives the information in UCD and MAP messages from the UMAC process executed by CPU 278 and FPGA 276. In some embodiments, the PHY receiver uses the center frequency of the band of interest to control the frequency of a down conversion signal generated by a digital local oscillator that is used to digitally mix with the incoming samples to move the upstream channel of interest down to baseband where the channel is filtered and decimated according to its sample rate/bandwidth as determined from the UCD data.

In an alternative embodiment, the RF sections 190, 192, etc. are RF tuners which receive UCD and MAP data from the UMAC process or arbitrator 276 and tune to specific upstream logical channels specified by the UMAC process or arbitrator. In FIG. 12, the elements that have the same reference numbers as elements in FIG. 10 have the same structure and function as their preferred embodiment and alternative embodiment counterparts in FIG. 10. The PHY receivers still control the switching of the crossbar switch 208 based upon burst assignment data they receive on data path 254 from the arbiter 276. The PHY receivers also control the gain of the RF tuners via control signals or data on data path 210 so as to maximize the efficiency of use of the A/D converters. The main differences over the embodiments of FIG. 10 is that the FIFOs 166 and 268 have been removed and the UMAC process must coordinate the MAP information elements for each logical channel so that no more than four (or whatever the number of the PHY receivers is) bursts can arrive simultaneously on the upstream logical channels. If more bursts arrive simultaneously than there are PHY receivers to handle them, the excess bursts will be lost since there is no FIFO buffer on any output channel of the crossbar switch to store the excess sample data. Therefore, the UMAC process must coordinate scheduling of bursts so this does not happen.

During contention intervals such as ranging and upstream bandwidth request intervals, bursts arrive randomly and not under control of any MAP activity by the CMTS. To deal with simultaneously arriving bursts during contention intervals, the crossbar switch 208 will sense energy on the inputs and select no more than four simultaneously arriving bursts (or however many outputs there are to which bursts can be coupled) for coupling to the four outputs 264, 266, etc. The non selected bursts will be lost, but the cable modem MAC protocols will try again when they do not get a message back from the CMTS.

The arbiter 276 receives the UCD and MAP data on data path 179 from the CPU 278 which cooperates with and controls FPGA 276 via control bus 175 to carry out the UMAC process. The arbiter then decides which receiver will process each burst defined in the MAP IEs. The arbiter then sends the UCD data for the logical channel on which a burst will be arriving to the receiver which has been assigned to receive it in time for the receiver to configure itself to receive the burst. The recovered data from the burst symbols is then output directly to the UMAC FPGA 276. Other processing by the UMAC process to receive upstream messages and generate downstream messages to carry out DOCSIS protocols and define upstream logical channels is the same as in the embodiments of FIGS. 10 and 11.

Figure 13:
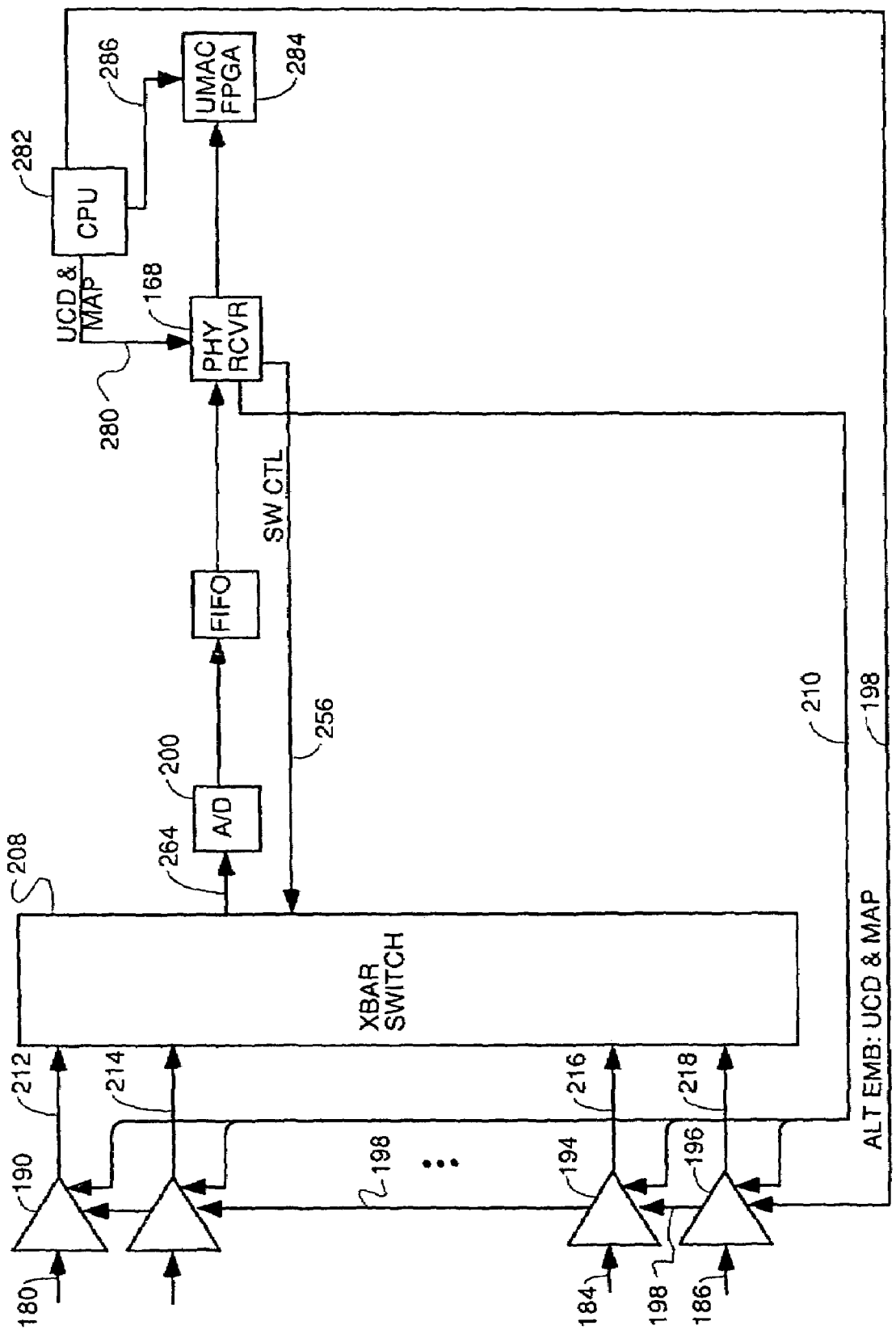
FIG. 13 is a block diagram of a simple upstream line card for a DOCSIS CMTS receiver which only uses a single shared PHY receiver and a digital switch to couple bursts from multiple input cables to the shared receiver.

FIG. 13 is a block diagram of a simple upstream line card for a DOCSIS CMTS receiver which only uses a single shared PHY receiver and a digital switch to couple bursts from multiple input cables to the shared receiver. No arbiter is used because there is only one receiver. All circuit elements with the same reference numbers as in the embodiment of FIG. 10 work the same way and have the same structure as the embodiment of FIG. 10. The PHY receiver still controls the switching of the digital switch 208 via control signals on data path 256 based upon MAP data the PHY receiver receives on data path 280 from CPU 282. The CPU 282 coordinates with and controls FPGA 284 via data and control signals on data path 286 to carry out a UMAC process. The PHY receivers also control the gain of the RF sections via control signals or data on data path 210 so as to maximize the efficiency of use of the A/D converters. The UMAC process works the same way as the embodiment of FIG. 10 in terms of receiving upstream messages and generating downstream messages to implement DOCSIS protocols and define and manage the upstream logical channels via UCD and other DOCSIS messages. The MAP messages however must be coordinated on all the upstream logical channels connected to the digital switch 208 so that there is no overlap in time between bursts arriving on different channels unless the PHY receiver can process more than one burst simultaneously (which is an alternative embodiment). In other words, not more than one burst can be arriving at any particular time on the various upstream logical channels because the PHY receiver in the embodiment of FIG. 13 can only process one burst at a time.

The Sequoia-Based Linecard

Figure 14:
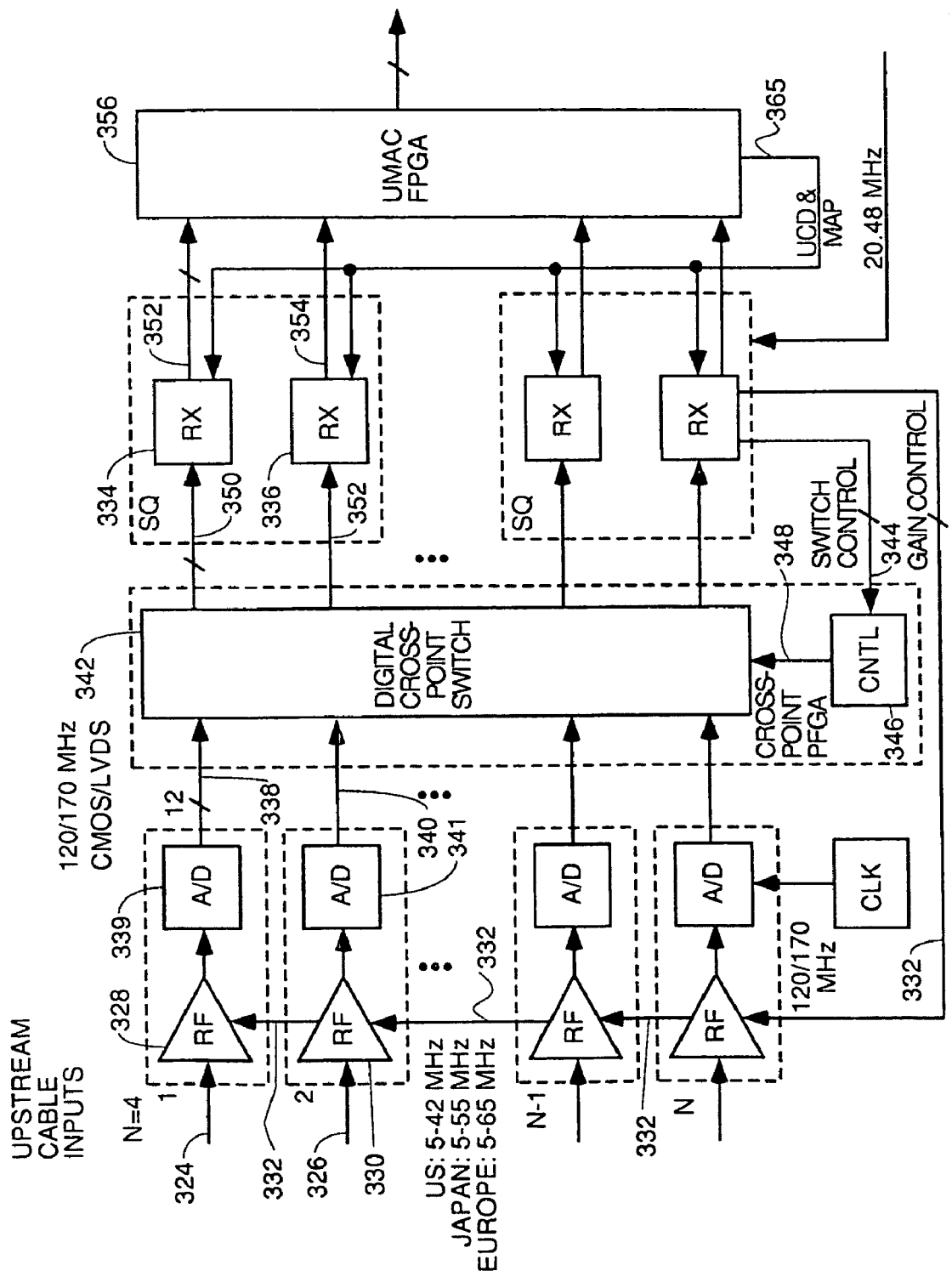
FIGS. 14 and 15 are block diagrams of the preferred upstream line card and an alternative embodiment.

Referring to FIG. 14, there is shown a block diagram of one embodiment of a Sequoia-based linecard. In the preferred embodiment, the Sequoia PHY receiver linecard is implemented in an FPGA. The Sequoia linecard (hereafter, the preferred linecard) is comprised of a plurality of RF inputs (324, 326 typical) for coupling to different optical nodes. An RF section (328, 330 typical) amplifies the entire upstream frequency band by a gain controlled by gain control data on bus 332 generated by the DOCSIS compatible receivers (334, 336 typical). The output signals from the RF sections are digitized in A/D converters (339, 341 typical) at a sample rate of 120 or 170 MHz depending upon whether the CMTS will be used in the US or Europe to generate a plurality of 12 bit samples of the signal on each RF input. The plurality of output streams output from the A/D converters are supplied as inputs (338, 340 typical) to a digital crosspoint switch 342.

Switching by the digital crosspoint switch 342 is controlled by the PHY receivers by switch control data on bus 344. A control circuit 346 translates the switch control data into signals on path 348 which control which input (338, 340, etc.) is coupled to which output (350, 352, etc.). The outputs are coupled to the inputs of DOCSIS compatible receivers (334, 336 typical). The outputs of the receivers (352, 354, typical) carrying recovered data are coupled to a UMAC FPGA 356.

The UMAC FPGA generates coordinated downstream UCD and MAP messages to coordinate all downstreams that are coupled to CMs coupled to optical nodes that are coupled to inputs 324, 326, etc. (an upstream group). The UMAC process decides from the MAP data which of the receivers 334, 336, etc. is to receive each burst during non contention intervals. The UMAC process then sends the appropriate MAP data for each burst to the receiver which has been assigned to receive it via bus 365. The MAP data includes the upstream minislot at which the burst starts, the length of the burst, the cable modem from which the burst originated (the SID number), the IUC number of the burst (the burst type) and the logical channel number. This information is used to search a lookup table to find the particular RF section at which the burst will be arriving. The contents of the lookup table are written with configuration data which indicates from which optical node the receiver should expect to receive the burst and which input is coupled to each optical node. The information as to the RF section at which the burst will be arriving is used to generate the switch control commands on bus 349 which control operation of the crosspoint switch 347 during normal operation during non contention intervals.

Figure 15:
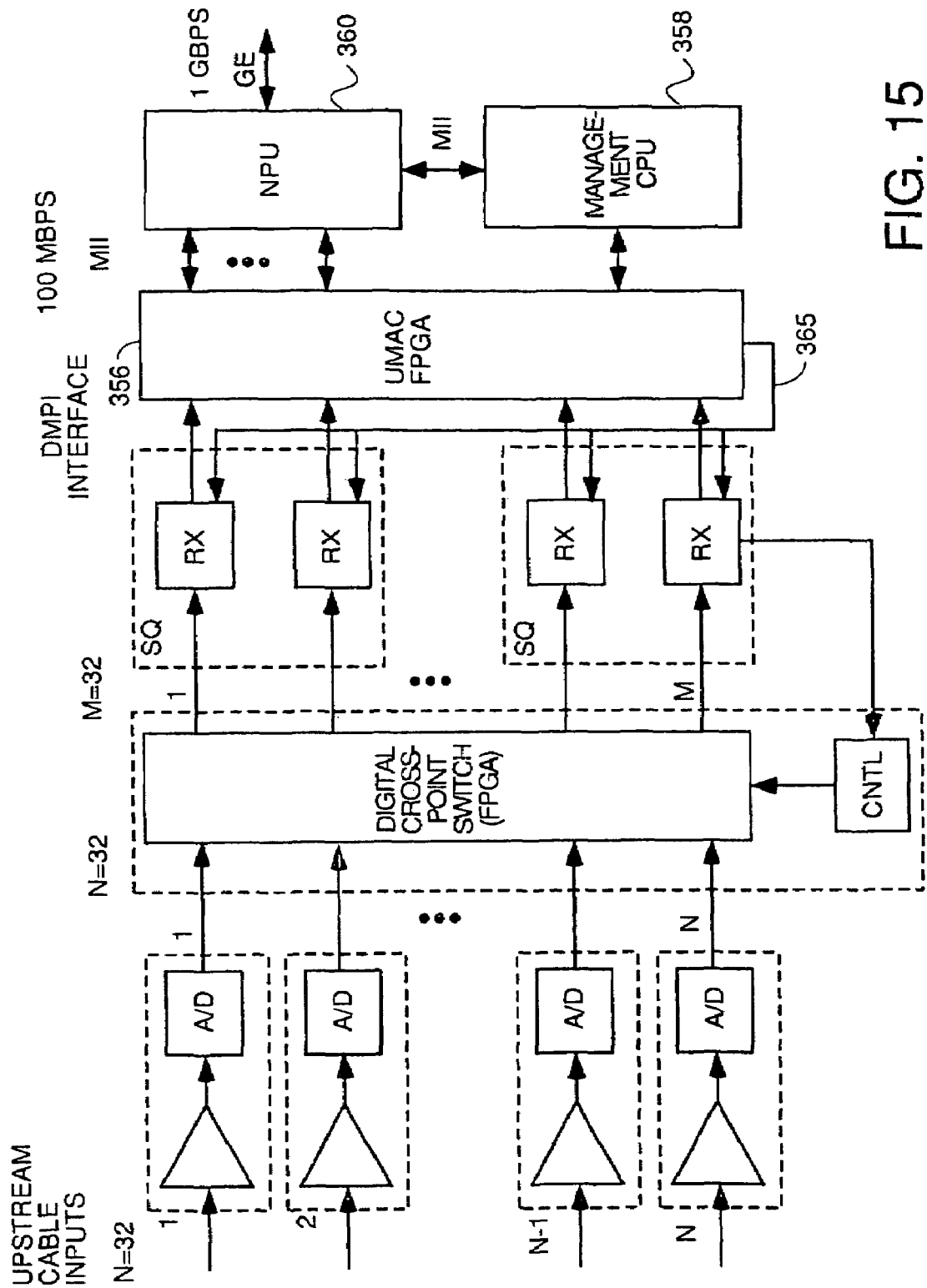

In the preferred embodiment, this process of assigning receivers to receive particular bursts and sending the appropriate MAP data to the assigned receiver is carried out in software executed by the management CPU 358 in FIG. 15. In other embodiments, it can be carried out by the FPGA 356 or the entire UMAC process can be carried out in software in a microprocessor including the process of assigning receivers and sending the appropriate MAP data to each receiver. Each receiver also receives the appropriate UCD data for the upstream channel upon which the burst will be arriving along with the IUC burst type so that it can set itself up properly to receive the burst.

Any conventional DOCSIS UMAC process and DOCSIS compatible receiver which is capable of performing the above defined functions will suffice to practice the invention.

FIG. 15 is a block diagram of another embodiment for a linecard using a digital crosspoint switch. In this embodiment, a management CPU 358 and an NPU 360 are added to communicate with the UMAC FPGA. The management CPU is based upon a Motorola MPC8270 running at 450 MHz and handles the DOCSIS ranging and bandwidth request protocols and MAP message generation. The UMAC FPGA handles the DMPI interface, DES encryption and CRC/HCS checking. The NPU handles the GMII interface, concatenation, fragmentation, payload header suppression/expansion, MIB counters, media access control management and upstream bandwidth request queues for the management CPU and handles priority queuing. Since the only aspect of the invention which involves these circuits is how the UCD and MAP messages are coordinated to allow sharing of upstream receivers without noise aggregation, more detail about their programming is not necessary.

The nature of the coordination of UCD and MAP messages of both these embodiments is as follows in the preferred embodiment.

Requirements to Share an Upstream Receiver Among Multiple Downstreams

A CMTS which can transmit multiple downstreams to multiple cable modems all of which share the same upstream has to have certain characteristics. Specifically, there are certain requirements on the downstreams which differ depending upon whether the shared upstream allows synchronous code division multiple access (SCDMA) bursts or not.

If the shared upstream is time division multiplexed only and no SCDMA bursts are allowed, then the only requirements on the downstreams are as follows. In the claims, the downstreams which have these characteristics and which share an upstream are referred to as coordinated downstreams.

1) Each downstream transmitter for a downstream that shares an upstream must have a timestamp counter or something equivalent which counts the same master clock. Fixed offsets in the timestamp counts are permissible, but no drift is permissible.

2) Each downstream transmitter must transmit sync messages or something equivalent which contain the timestamp counts which the CMs can use to keep a local timestamp counter in each CM "synchronized" to the timestamp counter of the downstream transmitter the CM is tuned to. Synchronized means a proper offset between the timestamp counts exists so that when a CM gets an upstream timeslot or minislot assignment, it can use its timestamp counter to determine the correct time to transmit so that its bursts arrive at the CMTS aligned in time with the boundaries of the assigned timeslots or minislots.

3) Each downstream transmitter must transmit a UCD message or something equivalent which defines the shared upstream in terms of the same parameters, with each UCD message containing the downstream ID of the downstream it is transmitted upon and the upstream ID of the shared upstream.

4) Each downstream transmitter must transmit a MAP message or there must be something which tells the CMs when a ranging contention interval exists when CMs can transmit upstream ranging bursts in response to the MAP message using the downstream ID from the UCD message in the downstream to which the CM is tuned. This ranging process is an attempt to coordinate with the CMTS by an exchange of messages to set a proper offset into the CM timestamp counter so as to achieve synchronization. The MAP messages must be coordinated so that they all define the same ranging contention interval in the upstream and there is no conflict between the timeslot assignments on the upstream between different CMs.

5) The CMTS must be able to build routing tables for each downstream from information in the ranging bursts or registration messages of each CM. Specifically, if the ranging bursts are used, the CMTS must be able to build the routing table for each downstream from the downstream ID information and the SID or something equivalent which identifies the CM which sent each initial ranging burst so as to automatically determine which CMs are listening to each downstream.

If the upstream allows SCMDA bursts (the following requirements would also work if the upstream allows both SCDMA and TDMA bursts), the requirements are as follows. In the claims, the downstreams which have these characteristics and which share an upstream are referred to as coordinated downstreams.

1) Each downstream transmitter for a downstream that shares an upstream must have a timestamp counter or something equivalent which counts the same master clock. Fixed offsets in the timestamp counts are permissible, but no drift is permissible.
2) Each downstream transmitter must use the same frequency symbol clock and the same symbol rate and the symbol clocks on all downstreams must be locked in phase.
3) The CMs must each recover the downstream symbol clock of the downstream it is tuned to and synchronize its upstream symbol clock to the downstream symbol clock using an M/N relationship between the frequency and phase of the downstream symbol clock versus the frequency and phase of the upstream symbol clock, where M and N are integers, and the upstream symbol clock is at a frequency suitable to generate spread spectrum bursts. In non DOCSIS systems with suitable range, the symbol clocks on the downstreams could be different but they would have to be harmonically related such that any downstream clock that is different than another downstream clock would have to have a frequency which is an integer multiple of the downstream symbol clock of the other downstream symbol clock(s).
4) Each downstream transmitter must transmit sync messages or something equivalent which contain the timestamp counts which the CMs can use to keep a local timestamp counter in each CM "synchronized" to the timestamp counter of the downstream transmitter in the CMTS to which the CM is tuned. Synchronized means a proper offset between the timestamp counts exists so that when a CM gets an upstream timeslot or minislot assignment, it can use its timestamp counter to determine the correct time to transmit so that its bursts arrive at the CMTS aligned in time with the boundaries of the assigned timeslots or minislots.
5) Each downstream transmitter must transmit a UCD message or something equivalent which defines the shared upstream in terms of the same parameters, with each UCD message containing the downstream ID of the downstream it is transmitted upon and the upstream ID of the shared upstream.
6) Each downstream transmitter must transmit a MAP message or there must be something which tells the CMs when a ranging contention interval exists when CMs can transmit upstream ranging bursts in response to the MAP message using the downstream ID from the UCD message in the downstream to which the CM is tuned. This ranging process is an attempt to coordinate with the CMTS by an exchange of messages to set a proper offset into the CM timestamp counter so as to achieve synchronization. The MAP messages must be coordinated so that they all define the same ranging contention interval in the shared upstream transmitter and there is no conflict between the timeslot assignments on the upstream between different CMs.
7) The CMTS must be able to build routing tables for each downstream from information in the ranging bursts or registration messages of each CM. Specifically, if the ranging bursts are used, the CMTS must be able to build the routing table for each downstream from the downstream ID information and the SID or something equivalent which identifies the CM which sent each initial ranging burst so as to automatically determine which CMs are listening to each downstream.

The FPGA functions are spectrum analysis since one spare receiver can calculate the spectrum of any cable input in segments of 6.4 MHz by using its ICF block. The FPGA needs to multiplex the appropriate RF input port to the spare PHY receiver.

The various receivers on the linecard can be dynamically allocated to each node. This is especially useful when the number of PHY receivers is greater than or equal to the number of RF ports for the following cases.

During elevated demand, the load balancing can automatically distribute the traffic evenly between the receivers. Low use cable nodes can share receivers in a time multiplexed manner, and high use cable nodes can use more receivers as required without the need for node splitting and recombining. This means the linecard can achieve higher capacity due to higher degree of statistical multiplexing.

When mixed mode of DOCSIS 2.0 and DOCSIS 1.x is used, the additional DOCSIS 1.x channels can use other PHY receiver chips without node splitting and recombining. In addition, the PHY receiver chips that support DOCSIS 1.x channels can be shared with other channels in a time multiplexed manner.

For example, to support a mixed mode of one 6.4 MHz DOCSIS 2.0 logical channel and four 1.6 MHz DOCSIS 1.x channels, a total of four PHY receivers are required where one PHY receiver receives the 2.0 channel and one 1.x channel, and the three additional PHY receivers support the other three 1.x channels. The FPGA of either FIG. 14 or FIG. 15 allows using all the four PHY receiver chips without node splitting and recombining (flex nodes) and only one instead of four RF sections is needed. In addition, the three PHY receivers that are receiving 1.x channels are under utilized and can be used in a time multiplexed manner to receive bursts from other upstream channels.

Also, for wideband DOCSIS, used for throughput increase by utilizing a couple of upstream channels, the appropriate number of PHY receivers can be allocated automatically to the RF node without splitting the RF cables. Wideband DOCSIS is described in U.S. patent application Ser. No. 10/446,511, filed May 28, 2003, entitled WIDEBAND DOCSIS ON CATV SYSTEMS USING PORT TRUNKING which is hereby incorporated by reference. Splitting the RF cables can cause the received power to drop below the specified power levels required by the CMTS.

Figure 16:
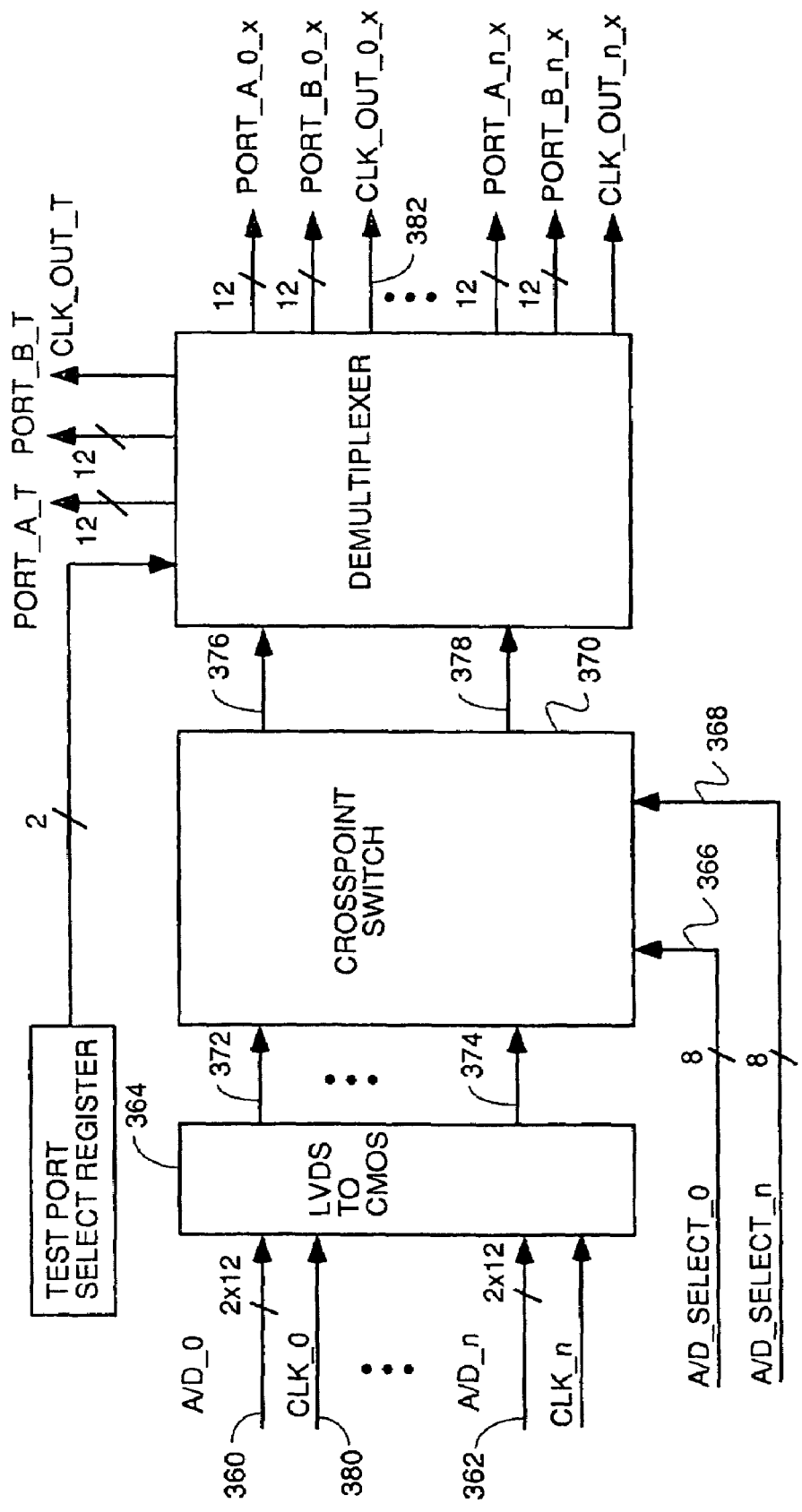
FIG. 16 is a block diagram of the preferred crosspoint switch architecture.

FIG. 16 is a block diagram of the digital crosspoint switch. The input samples from the A/D converters arrive in LVDS mode on lines 360 and 362, etc. An LVDS to CMOS converter 364 converts the LVDS samples to CMOS logic levels. A/D select signals on buses 366 and 368 control a crosspoint switch 370 to select one of the A/D inputs and couple it to both of the output ports assigned to that A/D input and couples the corresponding clock to the clock output assigned to that A/D input. For example, when the A/D_select_0 signal is active, the A/D_0 sample stream on line 360 is coupled to Port_A_0_x and Port_B_0_x and the CLK_0 signal on line 380 is coupled to the CLK_Out_0_x output. Likewise, when the A/D_select_n signal is active, the crosspoint switch couples the A/D_n sample stream to Port_A_n_x and Port_B_n_x and the CLK_n clock signal is coupled to the CLK_Out_n_x output. The data output from each port is in parallel mode (not interleaved) as defined for CMOS output in the data sheets of the AD9430 A/D converters. The output of each channel consists of Port_A and Port_B at half the A/D clock and a Clock signal. The Port_B output carries the sample that is received after the sample ouput via Port_A. This, if Port_A outputs sample n, Port B simultaneously outputs sample n+1.

The FPGA includes a programmable buffer for generating a programmable test pattern, and for also capturing the received signal for testing. The FPGA memory should be as big as possible. A memory of 0.4 Mbits can store a 1,000-symbol burst at 5.12 Msps. The CPU in the line card should be able to write and read the buffer 388.

Figure 17:
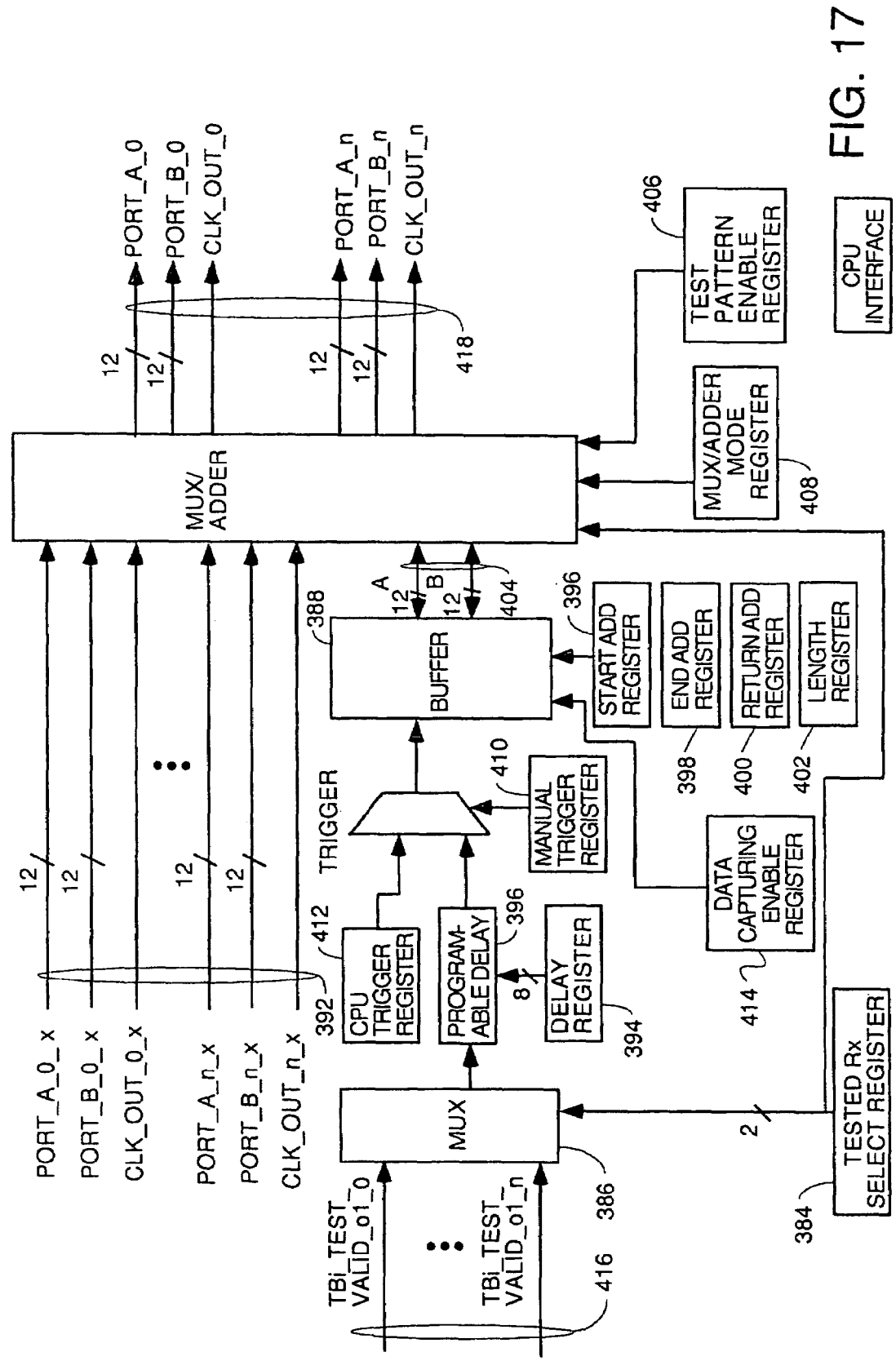
FIG. 17 is a block diagram of the preferred test pattern generator.

FIG. 17 is a block diagram of the preferred test pattern generator. The trigger signal TBj_TEST_VALID_01_I (j=1 or 2) is obtained from each PHY receiver. If there are two receivers, then there will be two trigger signals the timing of which will be programmable and which can be activated at any specified timestamp. The tested receiver select register 384 controls which receiver is going to receive the test pattern. It selects the trigger signal from the appropriate receiver via multiplexer 386 and directs the pattern via the buffer 388 and multiplexer/adder 390 to the correct Port_A_I and Port_B_I.

In order to start transmitting the test pattern with finer time resolution, the trigger signal can be delayed according to an amount of delay programmed into delay register 394 and implemented by programmable delay element 396. The delay can be implemented using a high speed counter run by a high speed clock such as the A/D clock.

The starting address register 396 and end address register 398 are the start address of the pattern and end address of the test pattern. When reaches the end address, the pattern is recycled. The return address register 400 is the return address when a recycle is performed. The length register 402 contains data that defines the length of the test pattern.

The multiplexer/adder 390 has two modes of operation, as controlled by the MUX/Adder Mode register 408 contents. In the first mode, the circuit acts as a multiplexer and it can select either sample data on input ports 392 or the test pattern on ports A and B outputs 404 from the buffer 388. The second mode is adder mode wherein the test pattern data on buses 404 is added to the channel noise on the port inputs 392. When the test pattern enable register contains a logic 1, the test pattern is output at the appropriate time.

The MUX/adder 390 outputs the test pattern to the selected output I (Port_A_I, Port_B_I, CLK_OUT_I) as pure test pattern or after summation with the received data according to the contents of the Tested Rx Selected Register.

The trigger can be set in manual triggering mode, where the CPU sets the trigger instead of using the PHY receiver trigger signal. This is useful for capturing the received data into buffer 388 or for transmitting the test pattern to the PHY receiver at any time which is not synchronized to the PHY receiver timebase. To use manual triggering, the CPU should write a one to the manual trigger register 410, and then trigger by writing a one into the CPU trigger register 412.

Data Capture Mode

In data capture mode, the received signal is stored in the buffer for later processing. The performance of the RF section can be evaluated and also the data received from the modems can be captured for further evaluation. The data capturing operation is synchronized to the MAP via the trigger signal, and the data to be captured is selected from ports 392 according to the contents of register 384. The contents of register 384 also select which trigger signal on lines 416 will be used. This mode is initiated with a one is written into the data capturing enable register 414. Data capturing will then be started when the trigger signal is activated. The appropriate trigger signal is selected according to a value in the Test Rx Select Register 384 and this trigger signal can be delayed by the value in register 394. Once started, the captured data will be written into the buffer starting at the address in register 396 and finishing at the address in register 398.

While the data is being captured, it is simultaneously be output on the appropriate Port_A_i and Port_B_i output lines 418.

The test pattern generator eliminates the need for a test cable modem and allows programmable data to be injected into a selected PHY receiver for testing. Buffer 388 can also be used to capture the incoming sample stream by controlling multiplexer 390 to couple the sample streams on the input port lines 392 to buffer 388. These samples can later be injected into the PHY receivers by suitably controlling multiplexer 390.

Although the invention has been disclosed in terms of the preferred and alternative embodiments disclosed herein, those skilled in the art will appreciate possible alternative embodiments and other modifications to the teachings disclosed herein which do not depart from the spirit and scope of the invention. All such alternative embodiments and other modifications are intended to be included within the scope of the claims appended hereto.

What is claimed is:

1. A cable modem termination system receiver upstream line card comprising:

a plurality of RF means each having an input for coupling to a cable of a hybrid fiber coaxial cable system, for preparing a radio frequency burst signal bearing data for analog to digital conversion;

a plurality of analog-to-digital converters (hereafter A/D converter), each having a signal input coupled to receive a signal output by one of said RF means and each having an output;

a digital crossbar switch having a plurality of inputs, each coupled to an output of an A/D converter and having one or more outputs and one or more control inputs for receiving signals which control which of said inputs of said crossbar switch is coupled to which of said outputs of said crossbar switch;

one or more cable modem termination system physical layer receivers (hereafter PHY receiver), each having an input coupled to an output of said crossbar switch and each having an input for receiving at least upstream channel descriptor (UCD) data and MAP data, said UCD data describing upstream logical channels which will carry bursts said PHY receiver is assigned to receive so that said PHY receiver assigned to receive each burst can configure itself properly to received said assigned burst, said MAP data describing when each burst said PHY receiver is assigned to receive will occur, and each PHY receiver having an output at which appears data recovered from each assigned burst said PHY receiver processed;

a control circuit coupled to said one or more control inputs of said crossbar switch and having an input for receiving at least MAP data indicating when authorized bursts on each logical channel on each cable coupled to an input of said crossbar switch will occur, said control circuit for determining which said PHY receiver will be assigned to receive each burst, and for generating control signals to control switching by said digital crossbar switch to couple each said burst to an assigned PHY receiver at a proper time to allow said PHY receiver to receive the bursts assigned to it; and an upstream media access control circuit for generating said UCD and MAP data, and for outputting said UCD and MAP data to said PHY receivers and said RF means, and for outputting said MAP data to said control circuit, and having a plurality of inputs, each coupled to an output of a PHY receiver to receive data recovered from said bursts, and for receiving upstream messages and generating downstream messages to carry out DOCSIS protocols for at least training and registration of cable modems on the system.

2. A cable modem termination system receiver upstream line card comprising:

a plurality of RF means each having an input for coupling to a cable of a hybrid fiber coaxial cable system, for preparing a radio frequency burst signal bearing data for analog to digital conversion, and having an input for receiving DOCSIS UCD and MAP data;

a plurality of analog-to-digital converters (hereafter AD converter), each having a signal input coupled to receive a signal output by one of said RF means and each having an output;

a digital crossbar switch having a plurality of inputs, each coupled to an output of an A/D converter and having one or more outputs and a number of control inputs equalling the number of outputs, each control input for receiving signals which control which of said inputs of said crossbar switch is coupled to the output of said crossbar switch which is associated with said control input;

one or more cable modem termination system physical layer receivers (hereafter PHY receiver), each having an input coupled to an output of said digital crossbar switch and each having an input for receiving at least upstream channel descriptor (UCD) data and MAP data, said UCD data describing upstream logical channels which will carry bursts said PHY receiver is assigned to receive so that said PHY receiver assigned to receive each burst can configure itself properly to receive said assigned burst, said MAP data describing when each burst said PHY receiver is assigned to receive will occur, and each PHY receiver having an output at which appears data recovered from each assigned burst said PHY receiver processed, and each PHY receiver having an output coupled to a control input of said crossbar switch associated with an output thereof which is coupled to said PHY receiver, each said PHY receiver having a port for receiving communications regarding assignment of bursts to said PHY receiver to process, each said PHY receiver functioning to generate control signals to control switching of said crossbar switch at a proper time so as to couple bursts said PHY receiver has been assigned to process to said input of said PHY receiver;

a control circuit coupled to said ports of said PHY receivers and having an input for receiving at least MAP data indicating when authorized bursts on each logical channel on each cable coupled to an input of said crossbar switch will occur, said control circuit for determining which said PHY receiver will be assigned to receive each burst, and for generating messages assigning each said PHY receiver to receive particular bursts assigned to it; and an upstream media access control circuit for generating said UCD and MAP data, and for outputting said UCD and MAP data to said PHY receivers and said RF means, and for outputting said MAP data to said control circuit, and having a plurality of inputs, each coupled to an output of a PHY receiver to receive data recovered from said bursts, and for receiving upstream messages and generating downstream messages to carry out DOCSIS protocols for at least training and registration of cable modems on the system.

3. A cable modem termination system upstream line card, comprising:

a plurality of radio frequency amplifier means for coupling to hybrid fiber coaxial cable system cables and tuning to logical channels and preparing received signals for analog to digital conversion, each radio frequency tuner having a gain control input;

a plurality of analog-to-digital converters, each for sampling at a high enough rate to satisfy the Nyquist criteria for the highest frequency logical channel which might be coupled to an input of said converter;

a digital crossbar switch having a plurality of inputs, each coupled to a signal output of one of said radio frequency tuner means, and having a plurality of outputs, each coupled to an input of an analog-to-digital converter, and having a switching control input for each said output;

a plurality of sample storage FIFOs, each coupled by first data path means to a sample output of an analog-to-digital converter, said first data path means for conveying data from a sample output of each analog-to-digital converter to an input of a FIFO dedicated to storing samples from said analog-to-digital converter;

a plurality of PHY receivers, each coupled by second data path means to an output of one of said plurality of FIFOs, and each having a switching control output coupled to one of said switching control inputs of said digital crossbar switch dedicated to receiving control signals to control coupling of inputs of said crossbar switch to an output of said crossbar switch coupled to said PHY receiver, and each having a plurality of gain control outputs, each coupled to a gain control input of one of said radio frequency tuners;

a plurality of recovered data storage FIFOs, each having an input coupled by third data path means to a recovered data output of one of said PHY receivers, and each having an output;

an arbiter coupled to said PHY receivers for determining which PHY receiver is to receive each burst and for sending messages to each PHY receiver assigning particular bursts said PHY receiver is to receive and supplying necessary UCD and MAP data to said PHY receiver; and upstream media access control means coupled to said outputs of said data storage FIFOs to receive recovered data stored therein and for carrying out all necessary messaging to implement DOCSIS training and registration protocols and for processing recovered data and for defining and assigning channel parameters to each upstream logical channel via a separate upstream channel descriptor message for each said upstream logical channel and for receiving upstream bandwidth requests from each cable modem which has successfully completed training and registered and for making bandwidth grants for each upstream logical channel via downstream MAP messages and for supplying said UCD and MAP data to said arbiter and to said radio frequency tuners.

4. A DOCSIS cable modem termination system upstream line card comprising:

means for receiving radio frequency signals bearing DOCSIS data bursts from a plurality of HFC cables, and filtering out noise and amplifying or attenuation said radio frequency signals to make best use of an analog-to-digital converter;

a crossbar switch coupled to said means for receiving via a plurality of inputs and having a plurality of outputs, said switch capable of coupling selected inputs to selected outputs under control of switch commands;

means coupled to said plurality of outputs of said switch for sampling signals appearing at said outputs at a sample rate which is high enough to satisfy the Nyquist criteria for the highest frequency signal which may be encountered and outputting the sample streams of the signals at each output as a separate channel;

means coupled to each said channel output for performing narrowband excision to remove narrow frequency band noise from the samples in each channel;

means for storing the samples of each channel output by said means for performing narrowband excision;

one or more receiver means for processing the samples of each channel to recover data encoded in said DOCSIS data bursts of each channel;

control means for assigning bursts to said receiver means and for controlling switching by said switch so as to couple DOCSIS bursts to the receiver means which have been assigned to receive them;

FIFO means for storing data recovered by each said receiver means; and upstream media access control (UMAC) means for processing data stored in said FIFO means, said UMAC means for processing upstream DOCSIS message data and generating downstream DOCSIS messages for transmission so as to carry out DOCSIS protocols and for receiving upstream payload data.

5. An upstream line card for a DOCSIS cable modem termination system, comprising:

a plurality of radio frequency amplifiers, each coupled to a different coaxial cable of one or more hybrid fiber coaxial cable systems, and each having a control input for receiving gain control data or a gain control signal, and each having an RF output;

an RF receiver control circuit having an output coupled to each said control input of said radio frequency amplifiers for supplying said gain control data or signal;

a plurality of low pass filters, each having an input coupled to said RF output of one of said radio frequency amplifiers, and each having an output;

a plurality of high pass filters, each having an input coupled to an RF output of one of said radio frequency tuners, and each having an output;

a crossbar switch having a plurality of inputs each coupled to an output of one of the low pass and high pass filters, and having a plurality of channel outputs, and having a switch control input for receiving signals or data which control which of said inputs are coupled to which of said channel outputs and when;

a switch control circuit having an output coupled to said switch control input of said crossbar switch, and having an input for receiving burst assignment data, said switch control circuit functioning to generate control signals or data at said output which controls switching by said crossbar switch;

a plurality of analog-to-digital converters (A/D), each having a signal input coupled to one of said channel outputs of said crossbar switch, and each having a sample output for one channel;

a plurality of narrow band excision (NBX) circuits, each having an input coupled to receive samples for one channel from one of said A/D converters, and each having an input for receiving frequency, sample rate and burst assignment data that defines which bursts are to be processed in each channel, the center frequency of the logical channel in which the burst will be transmitted and the sample rate of the burst, each NBX circuit having an input coupled to receive samples from one of said analog-to-digital converters (A/D) and having a channel output at which filtered sample data appears;

a narrow band excision control circuit which receives UCD, MAP and burst assignment data and sends the appropriate center frequency, sample rate and burst assignment data to each narrow band excision circuit to enable it to efficiently process the logical channel samples for each burst of a channel in which said NBX circuit is coupled;

a first-in-first-out memory having an input coupled to receive and store sample data output at each said channel output of a said NBX circuit;

a plurality of DOCSIS compatible receivers, each having a sample input coupled to an output of one of said FIFO memories, and each having an output at which data recovered from DOCSIS bursts appears, each receiver also having a control input for receiving burst assignment data telling said receiver which DOCSIS bursts each said receiver has been assigned to receive and DOCSIS UCD and MAP message data and burst assignment data to enable each said receiver to configure itself properly to process each burst it has been assigned to receive at the proper time;

an arbiter circuit having an output coupled to said control input of each said DOCSIS compatible receiver, and having an input for receiving UCD and MAP data, said arbiter for determining which of said receivers is to receive each DOCSIS burst authorized by said MAP data of all said logical channels defined by said UCD data, and for sending UCD, MAP and burst assignment data to said receivers, and for sending burst assignment data to said switch control circuit and said narrow band excision control circuit and said RF receiver control circuit;

a second plurality of FIFO memories, each coupled to receive and store the data recovered from DOCSIS burst by one of said receivers; and an upstream media access control circuit for processing upstream DOCSIS data and messages stored in said second plurality of FIFO memories and for composing DOCSIS downstream messages to implement DOCSIS protocols, and for generating UCD message data that defines parameters of a plurality of upstream channels on cables coupled to said inputs to said radio frequency tuners, and for receiving upstream bandwidth requests from cable modems and for generating MAP message data for each upstream logical channel which authorizes transmissions of DOCSIS data bursts at specific times on specific logical channels, and for sending said UCD and MAP data to said arbiter circuit.

6. An upstream line card receiver for a DOCSIS cable modem termination system, comprising:

a plurality of RF means each having an input for coupling to a cable of a hybrid fiber coaxial cable system, said RF means for preparing a radio frequency burst signal bearing data for analog to digital conversion and having a gain control input for receiving gain control signals, and each having an output;

a crossbar switch having a plurality of inputs, each coupled to an output of one of said RF means and having an output at which a signal selected from one of said inputs appears, and having a control input for receiving control signals or data which control which of said inputs of said crossbar switch is coupled to said output of said crossbar switch;

an analog to digital converter having an input coupled to said output of said crossbar switch and having an output at which samples of any signal appearing at said output of said crossbar switch appear;

a cable modem termination system physical layer receiver (hereafter PHY receiver), having an input coupled to said output of said analog to digital converter, and having an input for receiving at least DOCSIS upstream channel descriptor (UCD) message data and MAP message data, said UCD data describing upstream logical channels which will carry bursts said PHY receiver is assigned to receive so that said PHY receiver can configure itself properly to receive said assigned burst, said MAP data describing when each burst said PHY receiver is assigned to receive will occur, said PHY receiver having an output at which appears data recovered from each assigned burst said PHY receiver processed, said PHY receiver also having an output coupled to said control input of said crossbar switch to supply said control signals or data to control switching by said crossbar switch to couple bursts arriving on said cables to said input of said analog to digital converter, and having an output coupled to said gain control inputs of said RF means for supplying gain control data to each said RF means when a burst to be processed by said PHY receiver arrives at said RF means; and means coupled to receive data recovered from said bursts by said PHY receiver, for carrying out an upstream media access control process to process said recovered data and coordinate with a downstream media access control process to implement DOCSIS protocols and generate UCD and MAP messages for transmitting to cable modems coupled to said cables.

7. An upstream line card receiver for a DOCSIS cable modem termination system, comprising:

a plurality of RF means each having an input for coupling to a cable of a hybrid fiber coaxial cable system, said RF means for preparing a radio frequency burst signal bearing data for analog to digital conversion, each RF means having an output;

a crossbar switch having a plurality of inputs, each coupled to an output of one of said RF means and having a plurality of outputs at each of which a signal selected from one of said inputs appears, and having a plurality of control inputs, each for receiving control signals or data which controls which of said inputs of said crossbar switch is coupled to a particular one of said outputs controlled by said control input;

a plurality of analog to digital converters, each having an input coupled to an output of said crossbar switch and each having an output at which samples of any signal appearing at said output of said crossbar switch appear;

a plurality of cable modem termination system physical layer receivers (hereafter PHY receiver), each having an input coupled to said output of one of said analog to digital converters, and each having an input for receiving at least DOCSIS upstream channel descriptor (UCD) message data and MAP message data and burst assignment, said UCD data describing upstream logical channels which will carry bursts each said PHY receiver is assigned to receive so that each said PHY receiver can configure itself properly to receive said assigned burst, said MAP data describing when each burst each said PHY receiver is assigned to receive will occur on a logical channel to which said MAP data pertains, each said PHY receiver having an output at which appears data recovered from each assigned burst said PHY receiver processed, each said PHY receiver also having an output coupled to one of said control inputs of said crossbar switch to supply said control signals or data to control switching by said crossbar switch to couple bursts arriving on said cables to an output of said crossbar switch which said PHY receiver controls and to which said PHY receiver is coupled through an analog to digital converter, and each PHY receiver having one or more outputs coupled to one or more gain control inputs of said RF means for supplying gain control data to said RF means; and means coupled to receive data recovered from said bursts by said PHY receivers, for carrying out an upstream media access control process to process said recovered data and coordinate with a downstream media access control process to implement DOCSIS protocols and generate UCD and MAP messages for transmitting to cable modems coupled to said cables.

8. A process carried out in a cable modem termination system for sharing one or more DOCSIS receivers to receive data burst signal from a number of optical nodes in one or more hybrid fiber coaxial cable systems without noise aggregation, comprising:

1) in each of a plurality of RF tuners receiving UCD and MAP data and tuning to a logical channel on coaxial cable on which a DOCSIS upstream data burst is scheduled to arrive, amplifying or attenuating said data burst signal as needed in accordance with a gain control signal to prepare the signal for analog to digital conversion and filtering out excess noise and outputting the processed signal from each input of a digital switch;

2) receiving switching commands in a crossbar switch and responding thereto by coupling a selected input to a selected output at a selected time;

3) converting the signal at each output of said crossbar switch to digital samples using an analog-to-digital converter;

4) processing said digital samples in one or more DOCSIS compatible receiver to recover data encoded into each burst; and 5) processing said recovered data from each burst in an upstream media access control (UMAC) process which carries out DOCSIS training and registration and other protocols and which defines UCD data for each upstream logical channel and receives upstream bandwidth requests and responds thereto by generating MAP data for each logical channel which defines when each cable modem coupled to an upstream logical channel can transmit a burst and coordinating generation of said MAP data for all said logical channels on cables coupled to inputs of said crossbar switch according to the number of DOCSIS compatible receivers in use and whether or not buffer memory is being used to store sample data generated by said analog to digital converter.

9. The process of claim 8 further comprising the steps of filtering the output of each said tuner in a high pass filter and a low pass filter and coupling the outputs of said low pass and high pass filters to separate inputs of said digital switch.

10. The process of claim 8 wherein said digital switch has a plurality of outputs and wherein step 3 comprises digitizing the signal at each output in an analog to digital converter dedicated to that output to generate a separate stream of output samples for each output of said digital switch, and wherein step 4 comprises processing the samples from each said analog to digital converter in a separate DOCSIS compatible PHY receiver to recover burst data.

11. The process of claim 10 further comprising the step of controlling the gain of each RF tuner using gain control signals from a PHY receiver so as to make full use of the dynamic range of said analog to digital converter and not exceed the linear range of conversion.

12. The process of claim 10 further comprising the step of controlling the gain of each RF tuner using gain control signals generated by said UMAC process.

13. The process of claim 10 further comprising the step of filtering the output sample stream from each analog to digital converter in a narrow band excision filter to remove narrow band interference.

14. The process of claim 10 further comprising the step of storing said output sample stream from each said analog to digital converter in a separate first-in, first-out (FIFO) memory.

15. The process of claim 10 further comprising the step of storing said output data recovered by each of said PHY receivers in a separate first-in, first-out (FIFO) memory.

16. The process of claim 15 further comprising the step generating said gain control signal for each said RF tuner in a PHY receiver and further comprising the step of storing said output sample stream from each said analog to digital converter in a separate first-in, first-out (FIFO) memory.

17. The process of claim 15 further comprising the step of generating said gain control signal for each RF tuner in said UMAC process.

18. The process of claim 15 further comprising the step of generating said gain control signal for each said RF tuner in a PHY receiver and further comprising the step of storing said output sample stream from each said analog to digital converter in a separate first-in, first-out (FIFO) memory and storing data recovered by each said PHY receiver in a separate FIFO memory.

19. The process of claim 15 further comprising the step of generating said gain control signal for each said RF tuner in a PHY receiver and further comprising the step of storing said output sample stream from each said analog to digital converter in a separate first-in, first-out (FIFO) memory and storing data recovered by each said PHY receiver in a separate FIFO memory and further comprising the step of generating switching commands to control switching of each output of said digital switch by a PHY receiver coupled to process sample data generated from a signal appearing at said output.

20. A process carried out in a cable modem termination system for sharing one or more DOCSIS receivers to receive burst signals from a number of optical nodes in one or more hybrid fiber coaxial cable systems without noise aggregation, comprising:
1) in each of a plurality of RF amplifier sections receiving radio frequency signals modulated with upstream data symbols and amplifying or attenuating said burst signals as needed in accordance with a gain control signal to prepare the burst signals for analog to digital conversion and outputting the processed signal from each RF amplifier section to an input of a crossbar switch;
2) coupling a burst signal appearing at a selected input of said crossbar switch to a selected output at a selected time;
3) converting each said burst signal appearing at an output of said crossbar switch to digital samples;
4) storing said samples generated from each said burst signal in a FIFO memory dedicated to storing samples of signals appearing at a particular output;
5) examining UCD and MAP data and determining which bursts authorized in said MAP data will be processed by each of a plurality of DOCSIS compatible receivers and sending UCD and MAP data along with burst assignment data to each PHY receiver to tell each PHY receiver which burst samples it is supposed to process; and
6) processing digital samples of bursts stored in each said FIFO memory in a DOCSIS compatible receiver dedicated to processing samples of burst signals appearing at a particular output of said crossbar switch in accordance with said burst assignment data so as to recover data encoded into each burst.

21. The process of claim 20 further comprising the steps:
7) storing said data recovered by said DOCSIS compatible receiver in a separate FIFO dedicated to storing data recovered by a particular receiver; and
8) processing said recovered data stored in each said FIFO memory in an upstream media access control (UMAC) process which carries out DOCSIS training and registration and other protocols and which defines UCD data for each upstream logical channel and receives upstream bandwidth requests and responds thereto by generating MAP data for each logical channel which defines when each cable modem coupled to an upstream logical channel can transmit a burst, and coordinating generation of said MAP data for all said logical channels on cables coupled to said inputs of said digital switch according to the number of DOCSIS compatible receivers in use and the state of fullness of said FIFO memories.

22. A process carried out in a cable modem termination system for sharing one or more DOCSIS receivers to receive burst signals from a number of optical nodes in one or more hybrid fiber coaxial cable systems without noise aggregation, comprising:
1) in each of a plurality of RF amplifier sections receiving radio frequency signals modulated with upstream data symbols and amplifying or attenuating said burst signals as needed in accordance with a gain control signal to prepare the burst signals for analog to digital conversion and outputting the processed signal from each said RF amplifier sections;
2) converting each signal appearing at an output of one of said plurality of RF amplifiers to digital samples and supplying said samples to one of a plurality of inputs of a digital crossbar switch or multiplexer;
3) coupling samples appearing at one or more inputs of said digital crossbar switch or multiplexer to one or more selected outputs of said digital crossbar switch or multiplexer in accordance with burst assignment data;
4) examining UCD and MAP data and determining which bursts authorized in said MAP data will be processed by each of one or more PHY DOCSIS compatible receivers and sending UCD and MAP data along with burst assignment data to each PHY receiver to tell each PHY DOCSIS compatible receiver which burst samples it is supposed to process; and
5) processing said digital samples of bursts in one of said one or more DOCSIS compatible receivers so as to recover data encoded into each burst.

23. The process of claim 22 further comprising the step of storing said samples appearing at each output of said digital crossbar switch or multiplexer in a FIFO memory dedicated to storing samples of signals appearing at a particular one of said one or more outputs of said crossbar switch or multiplexer prior to processing by said PHY receiver.

24. The process of claim 22 wherein said RF sections tune to specific upstream logical channels using UCD, MAP and burst assignment data, amplify by a gain level established in a predetermined way, down convert logical channel signals to baseband, digitize and filter using a digital filter having its coefficients set according to UCD data to match the bandwidth of said upstream logical channel.

25. The process of claim 22 further comprising the step of coordinating MAP and downstream messages associated with a group of upstream messages to be received by one or more shared upstream PHY receivers so that said downstream messages are synchronized and said MAP messages define the same contention intervals for all said upstream messages and authorize bursts on said upstream messages that are to be received by one or more shared DOCSIS receivers such that there is either no overlap in upstream bursts from said different optical nodes or the number of overlapping bursts from different optical nodes in a group does not exceed the number of shared DOCSIS compatible receivers available to receive the bursts.

26. The process of claim 22 further comprising the step of coordinating MAP and downstream messages associated with a group of upstream messages to be received by one or more shared upstream PHY receivers so that said downstream messages are synchronized and said MAP messages define the same contention intervals for all said upstream messages and authorize bursts on said upstream messages that are to be received by one or more shared DOCSIS receivers such that there is either no overlap in upstream bursts from said different optical nodes or the number of overlapping bursts from different optical nodes in a group does not exceed the number of shared DOCSIS compatible receivers available to receive the bursts.

27. A process carried out in a cable modem termination system for sharing one or more DOCSIS receivers to receive burst signals from a number of optical nodes in one or more hybrid fiber coaxial cable systems without noise aggregation, comprising:

1) coordinating MAP and downstream messages associated with a group of upstream messages to be received by one or more shared upstream DOCSIS compatible receivers so that said downstream messages are synchronized and said MAP messages define the same contention intervals for all said upstream messages and authorize bursts on said upstream messages that are to be received by one or more shared DOCSIS receivers such that there is either no overlap in upstream bursts from said different optical nodes or the amount of overlap does not exceed the number of shared DOCSIS receivers available to receive the bursts;

2) receiving upstream radio frequency transmissions from a plurality of different optical nodes of one or more HFC systems;

3) selecting one or more signals or sets of samples from one or more optical nodes in an analog multiplexer or digital crossbar switch for reception and coupling each selected signal or set of samples to an input of a shared DOCSIS receiver; and 4) if the selected signal or signals have not been digitized by sampling, sampling said one or more selected signals before coupling said samples to said inputs of said one or more shared DOCSIS receivers.

28. A process for sharing one or more DOCSIS compatible receivers among a number of DOCSIS upstream logical channels, comprising the steps:

defining a plurality of DOCSIS upstream logical channels;
performing DOCSIS training and registration of a plurality of cable modems and receiving upstream bandwidth requests therefrom;
allocating bandwidth on each upstream logical channel in a DOCSIS MAP message and coordinating MAP messages for each upstream logical channel so as to not overflow capacity of one or more receivers which will process DOCSIS data bursts;
if more than one DOCSIS compatible receiver is available to process DOCSIS data bursts, deciding which receiver will process which data burst and sending all necessary information to said receiver to configure it to process the assigned data burst;
controlling a switch to couple selected data bursts arriving at a plurality of inputs of a crossbar switch or multiplexer to one or more selected outputs so as to prevent noise aggregation; and
amplifying, filtering and digitizing each data burst to provide a plurality of samples, and processing said samples of each said DOCSIS burst to recover the data therefrom.

29. An upstream line card for a DOCSIS cable modem termination system, comprising:

an analog multiplexer having a plurality of inputs for coupling to a plurality of cables from one or more hybrid fiber coaxial cable DOCSIS data delivery systems, and having a plurality of outputs, and having a control input;
control means coupled to said control input for controlling switching by said analog multiplexer;
a plurality of RF channel means, each coupled to an output of said analog multiplexer, for receiving burst assignment data, MAP data and UCD data and for tuning to an appropriate logical channel at an appropriate time, receiving an assigned burst signal, mixing it down to baseband, converting it to digital samples and storing said samples in a buffer and providing said samples at an output;
a plurality of DOCSIS compatible PHY receiver means each having an input for receiving sample data, for processing said sample data to retrieve data encoded in DOCSIS bursts;
an arbiter means having a plurality of inputs, each input coupled to an output of one of said RF channel means and having a port coupled to receive data from a media access control process and coupled to supply burst assignment data to said RF channel means and said control means, and having a plurality of outputs, each coupled to an input of one of said PHY receiver means, for determining which of said plurality of PHY receivers is to process each DOCSIS burst arriving at said analog multiplexer and sending burst assignment data and DOCSIS UCD data to said PHY receivers; and
a media access control process means coupled to receive data recovered from DOCSIS bursts by said PHY receivers, for implementing DOCSIS protocols and for receiving upstream bandwidth requests and for generating UCD and MAP messages and supplying said MAP data messages and/or UCD data to said RF channel means and said control means and said arbiter means.

30. A cable modem termination system upstream line card, comprising:

a plurality of radio frequency amplifier means, each coupled to receive upstream radio frequency signals from a hybrid fiber coaxial cable system and each for amplifying received radio frequency signals according to a gain controlled by a signal or data received at a gain control input;
a plurality of analog-to-digital converters, each for sampling at a high enough rate to satisfy the Nyquist criteria for the highest frequency signal which might be coupled to an input of said converter;
a crossbar switch having a plurality of inputs, each coupled to a signal output of one of said radio frequency amplifier means, and having a plurality of outputs, each output coupled to an input of one of said analog-to-digital converters, and having a switching control input for each said output;
a plurality of sample storage FIFOs, each coupled by first data path means to a sample output of one of said analog-to-digital converters, said first data path means for conveying data from a sample output of each analog-to-digital converter to an input of a FIFO dedicated to storing samples from said analog-to-digital converter;
one or more PHY receivers, each coupled by second data path means to an output of one of said plurality of FIFOs, and each having a switching control output coupled to one of said switching control inputs of said crossbar switch, and each capable of generating from data received from a UMAC process control signal to control coupling of inputs of said crossbar switch to an output of said crossbar switch coupled to said PHY receiver, and each said PHY receiver having a plurality of gain control outputs, each coupled to a gain control input of one of said radio frequency amplifier means, each PHY receiver capable of generating gain control signals at said gain control outputs, each PHY receiver capable of processing digital samples received from one of said FIFOs to extract data transmitted in a burst on a selected upstream channel and presenting said data at a recovered data output;
a plurality of recovered data storage FIFOs, each having an input coupled by third data path means to a recovered data output of one of said PHY receivers, and each having an output;
an arbiter coupled to said PHY receivers for determining which PHY receiver is to receive each burst and for sending messages to each PHY receiver assigning particular bursts said PHY receiver is to receive and supplying necessary UCD and MAP data to said PHY receiver; and
upstream media access control means coupled said outputs of said data storage FIFOs to receive recovered data stored therein and for carrying out all necessary messaging to implement DOCSIS training and registration protocols and for processing recovered data and for defining and assigning channel parameters to each upstream logical channel via a separate upstream channel descriptor message for each said upstream logical channel and for receiving upstream bandwidth requests from each cable modem which has successfully completed training and registered and for making bandwidth grants for each upstream logical channel via downstream MAP messages and for supplying said UCD and MAP data to said arbiter.

31. A linecard apparatus with a shared upstream DOCSIS receiver and no DOCSIS transmitter, comprising:
an analog crossbar switch having inputs for coupling to each of a plurality of different optical nodes and having a plurality of outputs and having a control input and functioning to connect the signals at selected inputs to selected outputs at selected time according to control signals;
a plurality of RF means, each having an RF input coupled to an output of said crossbar switch, each said RF means for amplifying radio frequency (RF) signals appearing at said RF input in a wide band amplifier, said amplification being by a gain established by a gain control signal appearing at a gain control input and for digitizing said amplified RF signals to generate a plurality of samples and storing said samples in a buffer;
one or more DOCSIS compatible receivers to be shared to process samples of RF signals containing DOCSIS upstream bursts and recover the data therefrom, each receiver having an input;
an arbiter having a plurality of inputs, each input coupled to receive samples from a buffer in one of said plurality of RF means, and having one or more outputs, each output coupled to an input of one of said one or more DOCSIS compatible receivers, said arbiter functioning to determine which buffer is to supply its samples to the input of which receiver and making the proper connections and processing to supply said samples to said input of said DOCSIS compatible receiver; and
a media access control (MAC) means coupled to receive data recovered by said one or more DOCSIS compatible receivers and to generate DOCSIS UCD and MAP messages and carry out DOCSIS protocols, said MAP messages for transmission on downstream data flow coupled to cable modems coupled to optical nodes which are coupled to inputs of said crossbar switch (hereafter the upstream group), said MAP messages being generated by said MAC means such that bursts are scheduled in said upstream group such that there are never more overlapping bursts (bursts which overlap in time but which are transmitted upstream from different optical nodes in said upstream group) than there are RF means to receive, digitize and buffer them.

32. A linecard apparatus with a shared upstream DOCSIS receiver and no DOCSIS transmitter, comprising:
an analog crossbar switch having inputs for coupling to each of a plurality of different optical nodes and having a plurality of outputs and having a control input and functioning to connect the signals at selected inputs to selected outputs at selected time according to control signals;
two or more RF means, each having an RF input coupled to an output of said crossbar switch, each said RF means for amplifying radio frequency (RF) signals appearing at said RF input in a wide band amplifier, said amplification being by a gain established by a gain control signal appearing at a gain control input and for digitizing said amplified RF signals to generate a plurality of samples and storing said samples in a buffer;
two or more DOCSIS compatible receivers, where the number of receivers equals the number of RF means, said receivers to be shared to process samples of RF signals containing DOCSIS upstream bursts and recover the data therefrom, each receiver having an input coupled to an output of a sample buffer in one of said two or more RF means, each receiver having an input to receive MAP data and an output at which it generates control signals to control switching by said crossbar switch such that bursts arriving on inputs of said crossbar switch are coupled at the right time to an output of said crossbar switch to which said receiver is coupled through one of said RF means; and
a media access control (MAC) means coupled to receive data recovered by said one or more DOCSIS compatible receivers and to generate DOCSIS UCD and MAP messages and carry out DOCSIS protocols, said MAP messages for transmission on downstream data flow coupled to cable modems coupled to optical nodes which are coupled to inputs of said crossbar switch (hereafter the upstream group), said MAP messages being generated by said MAC means such that bursts are scheduled in said upstream group such that there are never more overlapping bursts (bursts which overlap in time but which are transmitted upstream from different optical nodes in said upstream group) than there are RF means to receive, digitize and buffer them.

* * * * *

UNITED STATES PATENT AND TRADEMARK OFFICE
CERTIFICATE OF CORRECTION

PATENT NO. : 7,490,345 B2  Page 1 of 1
APPLICATION NO. : 10/860857
DATED : February 10, 2009
INVENTOR(S) : Rakib et al.

It is certified that error appears in the above-identified patent and that said Letters Patent is hereby corrected as shown below:

COLUMN 2:
Line 7: Please delete "usptream" and replace with --upstream--

COLUMN 6:
Line 32: Please delete "multplexer" and replace with --multiplexer--

COLUMN 11:
Line 60: After "This", please insert --is--

COLUMN 16:
Line 24: Please delete "amoung" and replace with --among--

COLUMN 23:
Line 19: Please delete "SCMDA" and replace with --SCDMA--

COLUMN 30:
Line 62: Please delete "SCMDA" and replace with --SCDMA--

COLUMN 32:
Line 66: Please delete "ouput" and replace with --output--

COLUMN 39:
Line 61: In Claim 7, after "burst", please delete "each"

Signed and Sealed this

Eleventh Day of August, 2009

David J. Kappos
*Director of the United States Patent and Trademark Office*